(12) United States Patent
Murakoshi

(10) Patent No.: US 9,370,711 B2
(45) Date of Patent: Jun. 21, 2016

(54) STORAGE MEDIUM STORING GAME PROGRAM AND GAME APPARATUS

(75) Inventor: Hiroki Murakoshi, Gyoda (JP)

(73) Assignee: NINTENDO CO., LTD., Kyoto (JP)

( * ) Notice: Subject to any disclaimer, the term of this patent is extended or adjusted under 35 U.S.C. 154(b) by 1814 days.

(21) Appl. No.: 11/907,334

(22) Filed: Oct. 11, 2007

(65) Prior Publication Data

US 2008/0293469 A1      Nov. 27, 2008

(30) Foreign Application Priority Data

May 23, 2007   (JP) ................. 2007-136766

(51) Int. Cl.
*A63F 13/00*      (2014.01)
*A63F 3/00*       (2006.01)

(52) U.S. Cl.
CPC . *A63F 13/00* (2013.01); *A63F 3/00* (2013.01); *A63F 2300/1075* (2013.01)

(58) Field of Classification Search
CPC .......................................................... A63F 3/00
USPC ........................................ 463/9, 10; 273/238
See application file for complete search history.

(56) References Cited

U.S. PATENT DOCUMENTS

| | | | | |
|---|---|---|---|---|
| 4,074,907 A * | 2/1978 | Curtis | ........................ | 273/282.1 |
| 4,436,309 A * | 3/1984 | Barlow et al. | ................ | 273/267 |
| 5,013,047 A * | 5/1991 | Schwab | ........................ | 273/238 |
| 5,423,556 A * | 6/1995 | Latypov | ............................ | 463/9 |
| 6,276,685 B1 * | 8/2001 | Sterling | ........................ | 273/241 |
| 6,579,177 B2 * | 6/2003 | Mraovic | ............................ | 463/9 |
| 7,059,964 B1 * | 6/2006 | Harpaz | ............................. | 463/9 |

FOREIGN PATENT DOCUMENTS

| | | |
|---|---|---|
| JP | 9-290041 | 11/1997 |
| JP | 2000-342847 | 12/2000 |
| JP | 2001-246152 | 9/2001 |
| JP | 2006-75504 | 3/2006 |

OTHER PUBLICATIONS

"Weekly Famitsu" issued by Enterbrain Inc., on Apr. 27, 2007, vol. 22, No. 17.

(Continued)

*Primary Examiner* — James S McClellan
*Assistant Examiner* — Syvila Weatherford
(74) *Attorney, Agent, or Firm* — Nixon & Vanderhye P.C.

(57) ABSTRACT

Displayed on a screen are: a game field having a plurality of squares; and panels which are respectively associated with a plurality of players and each of which is provided with one or more connecting portions for forming a combined state with another panel. A panel is selected in accordance with an operation performed by each player. In accordance with the operation performed by each player, square selection selects, from the game field, a square on which the panel is to be placed. Panel placing places, on the square selected by the square selection, the panel selected by the panel selection. Combined state determination determines whether or not panels, associated with a same player, among a plurality of panels placed on the game field have formed a predetermined combined state via the connecting portions. Evaluation evaluates the predetermined combined state which the combined state determination has determined to have been formed.

11 Claims, 21 Drawing Sheets

(56) References Cited

OTHER PUBLICATIONS

"Weekly Famitsu" issued by Enterbrain Inc., on May 25, 2007, vol. 22, No. 21.

"Famitsu DS plus Wii" issued by Enterbrain Inc., on Jun. 1, 2007, vol. 9, No. 6 (Whole No. 96).

"NintendoDream" issued by Mainichi Communications Inc., on Jun. 1, 2007, vol. 12, No. 6 (Whole No. 158).

"NintendoDream" issued by Mainichi Communications Inc., on Jul. 1, 2007, vol. 12, No. 7 (Whole No. 159).

"Dengeki DS & Wii Style" issued by MediaWorks Inc., on May 1, 2007, vol. 7, No. 10 (Whole No. 97).

"Dengeki Nintendo DS" issued by MediaWorks Inc., on Jun. 1, 2007, vol. 7, No. 11 (Whole No. 98).

\* cited by examiner

Fig. 26

| ON | ON | ON | ON | ON |
|----|----|----|----|----|
| ON | COLOR CARD | ON | ON | ON |
|    | ON | ON | 1P | ON |
| 2P |    | ON | ON | ON |
|    | ON | ON | ON | ON |

361

STORAGE MEDIUM STORING GAME PROGRAM AND GAME APPARATUS

CROSS REFERENCE TO RELATED APPLICATION

The disclosure of Japanese Patent Application No. 2007-136766, filed on May 23, 2007, is incorporated herein by reference.

BACKGROUND

1. Field of the Technology

The technology presented herein relates to a storage medium storing a game program to be executed by a computer of a game apparatus for executing a player-versus-player game, and particularly to a storage medium storing a game program to be executed by a computer of a game apparatus for executing a player-versus-player board game in which players, playing against each other, alternately place predetermined panels on a predetermined game field.

2. Description of the Background Art

There is a known conventional player-versus-player puzzle game. For example, there is a disclosed player-versus-player game in which players, playing against each other, alternately place pieces on vacant equilateral triangles in a figure fully covered with equilateral triangles, and a player, who has successfully formed an equilateral triangle from four equilateral triangles each having the player's piece placed thereon, becomes a winner (e.g., Japanese Laid-Open Patent Publication No. 9-290041).

There is another type of disclosed puzzle game in which: a board, on which a plurality of blocks each comprising a plurality of squares are provided in a grid pattern, is displayed; when a player places a piece on a square, a state of a block containing the square on which the piece is placed changes; and it is detected whether a predetermined number of consecutive blocks, which are in a same state or which are determined to be in a same state, have formed a vertical, horizontal or a diagonal line (for example, Japanese Laid-Open Patent Publication No. 2000-342847). In this game, two players alternately place, on squares, two types of pieces, i.e., a piece 1 (blue) and a piece 2 (red), thereby changing, by using ternary addition, a state of a block into any one of three states, i.e., blue state (1), red state (2) and yellow state (0). When a player A aligns five blocks in the blue or yellow state, the player A becomes a winner, whereas when a player B aligns five blocks in the red or yellow state, the player B becomes a winner.

There is still another type of disclosed puzzle game in which a player moves placement positions of panels each having a line drawn thereon, so as to complete a predetermined line drawing (e.g., Japanese Laid-Open Patent Publication No. 2001-246152). For example, there is a disclosed game apparatus for a puzzle game in which a plurality of quadrate panels, on each of which lines are drawn such that two peaks and the center thereof are connected, are placed on a game field, and a player moves the placed panels, thereby completing a closed-line figure in the game field.

There is still another type of disclosed puzzle game in which: panels each having a line drawn thereon appear from a bottom edge of a game field and move upward; a player connects lines drawn on the panels so as to form lateral consecutive lines across a game field from side to side, thereby causing the panels to disappear; and when the panels do not disappear and reach an upper edge of the game field, the game ends (e.g., Japanese Laid-Open Patent Publication No. 2006-75504).

However, game apparatuses disclosed in the patent publications mentioned above conventionally have problems described below. In the games of the game apparatuses disclosed in the Japanese Laid-Open Patent Publications No. 9-290041 and No. 2000-342847, a win/loss condition is to place pieces so as to form a predetermined shape, or to place blocks such that a predetermined number of consecutive blocks in a same state (color) are arranged in a predetermined direction. However, in these games, a state of connection between the pieces is not considered. In other words, regardless of the state of connection between the pieces, a player is only required to place the pieces so as to form the predetermined shape, or such that the predetermined number of blocks are arranged in a consecutive manner.

Also, in the games of the game apparatuses disclosed in the Japanese Laid-Open Patent Publications No. 2001-246152 and No. 2006-75504, a player is required to complete predetermined line drawing by moving a plurality of panels on each of which a line is drawn. These panels are provided in advance on a game field as initial setting, or randomly appear from an edge of the game field. The player is not allowed to select and place an arbitrary panel at an arbitrary position. Accordingly, the games disclosed in the Japanese Laid-Open Patent Publications No. 2001-246152 and No. 2006-75504 are not player-versus-player games which require players to play in a highly-strategic manner, but one-player puzzle games which require a player to use his/her intuition.

SUMMARY

Therefore, a main feature of an example embodiment presented herein is to provide a game program and a game apparatus for executing a novel player-versus-player game. Another object of the present invention is to provide a game program and a game apparatus for executing a highly-strategic player-versus-player game.

The present embodiment has the following features to achieve the above. Note that reference numerals, supplementary explanation and the like indicated between parentheses are merely provided to facilitate the understanding of the present embodiment in relation to the later-described embodiment, rather than limiting the scope of the present embodiment in any way.

A first aspect of the present embodiment is a storage medium storing a game program for causing a computer of a game apparatus to execute a player-versus-player board game in which a plurality of players alternately place predetermined panels on a predetermined game field, thereby playing against each other, the game program causing the computer to function as game field display means (S1, S11), panel display means (S1, S11), panel selection means (S21, S22), square selection means (S30), panel placing means (S31, S33, S34), combined state determination means (S8) and evaluation means (S9, S10). The game field display means displays, on a screen, a game field comprising a plurality of squares. The panel display means displays, on the screen, the panels which are respectively associated with the plurality of players and each of which is provided with one or more connecting portions for forming a combined state with another panel. The panel selection means selects, based on an operation performed by each player, a corresponding one of the panels. Based on an operation performed by said each player, the square selection means selects, from the game field, a square on which the corresponding one of the panels is to be placed.

The panel placing means places, on the square selected by the square selection means, the corresponding one of the panels which has been selected by the panel selection means. The combined state determination means determines whether or not panels, associated with a same player, among a plurality of panels placed on the game field have formed a predetermined combined state via the connecting portions. The evaluation means evaluates the predetermined combined state which the combined state determination means has determined to have been formed. Note that, the players herein include the CPU in the case where, e.g., the CPU acts as an opponent player in accordance with a predetermined thinking routine (i.e., in the case of Player VS CPU).

According to the above first aspect, processes performed based on the combined state of the panels are used for the player-versus-player game. This makes it possible to provide a novel and highly strategic player-versus-player game, in which each player is required to play in such a manner as to arrange the combined state of the panels while attempting to hinder an opponent player from combining the panels.

In a second aspect of the present embodiment based on the first aspect, the combined state determination means determines, based on a placement location of a most recently placed panel among panels placed by the panel placing means, whether or not the predetermined combined state has been formed.

According to the second aspect, the combined state is determined based on the panel most recently placed by a player. This improves the strategic characteristic of the player-versus-player game.

In a third aspect, the game program further causes the computer to function as adjacent state determination means for determining whether or not there is already a panel placed on a square adjacent to the selected square, which panel is associated with a player based on whose operation the selected square has been selected, and the panel placing means places the selected corresponding one of the panels only when the adjacent state determination means determines that there is already a panel placed on the square adjacent to the selected square, which panel is associated with the player, based on whose operation the selected square has been selected.

According to the third aspect, limitations may be set regarding positions on which a panel is placeable. This makes it possible to provide the player-versus-player game whose strategic characteristic is further improved.

In a fourth aspect, the game program further causes the computer to function as combined panel number detection means for, when the combined state determination means determines that the panels among the plurality of panels placed on the game field have formed the predetermined combined state via the connecting portions and that the panels forming the predetermined combined state are associated with the same player, detecting a number of panels forming the predetermined combined state, and the evaluation means evaluates the combined state in accordance with the number of panels detected by the combined panel number detection means.

According to the fourth aspect, an evaluation result may vary based on the number of panels contained in the combined state. This improves the strategic characteristic of the player-versus-player game, and makes the game more interesting.

In a fifth aspect, the panel display means further displays on the screen a common panel which is not associated with any of the players. The panel selection means selects, based on an operation performed by each player, a corresponding one of the panels or the common panel. The panel placing means places the corresponding one of the panels or the common panel, which is selected by the panel selection means, on the square selected by the square selection means. The combined state determination means determines whether or not panels among the plurality of panels placed on the game field have formed a predetermined combined state via the connecting portions, and whether the panels forming the predetermined combined state are associated with a same player or include the common panel.

According to the fifth aspect, the common panel, which any player can use, may be added to the game as another element. This makes it possible to provide the player-versus-player game whose strategic characteristic is further improved.

In a sixth aspect, the panel display means further displays, on the screen, a common panel which is not associated with any of the players. The panel selection means selects, based on an operation performed by each player, a corresponding one of the panels or the common panel. The panel placing means places the corresponding one of the panels or the common panel, which is selected by the panel selection means, on the square selected by the square selection means. The adjacent state determination means determines whether or not there is already a panel or the common panel placed on a square adjacent to the selected square, which panel is associated with a player, based on whose operation the selected square has been selected. The panel placing means places the corresponding one of the panels or the common panel, which has been selected, only when the adjacent state determination means determines that there is already a panel or the common panel placed on the square adjacent to the selected square, which panel is associated with the player, based on whose operation the selected square has been selected.

According to the sixth aspect, limitations may be set regarding positions on which a panel is to be placed, and the common panel, which any player can use, may be added to the game as another element. This further improves the strategic characteristic of the player-versus-player game, and makes the game more interesting.

In a seventh aspect, the game program further causes the computer to function as connecting portion position changing means operable to change, on the panels, positions in which the connecting portions are provided.

The seventh aspect allows the positions of the connecting portions provided on a panel to be changed, thereby broadening the options regarding which panel is to be combined with the panel. This further improves the strategic characteristic of the player-versus-player game, and makes the game more interesting.

In an eighth aspect, the panel display means displays the panels which are respectively provided with, in addition to the connecting portions, pieces of identification information each indicating a content of a corresponding one of the panels. The evaluation means includes: identification information determination means for determining whether or not the pieces of identification information about the panels forming the predetermined combined state satisfy a predetermined condition; and identification information evaluation means for evaluating the predetermined combined state in accordance with a determination result provided by the identification information determination means.

According to the eighth aspect, the panels are each provided with a piece of identification information, and pieces of identification information of combined panels are evaluated. This forces each player to consider, when forming a combined state, a combination of pieces of identification information. As a result, the strategic characteristic of the player-versus-player game is further improved.

In an ninth aspect, the identification information determination means determines that the predetermined condition is satisfied when the pieces of identification information about the panels forming the predetermined combined state indicate a same content, or when the pieces of identification information about the panels forming the predetermined combined state respectively indicate different contents and are arranged in a predetermined order.

The ninth aspect provides the same effect as that of the eighth aspect.

A tenth aspect is a game apparatus for executing a player-versus-player board game in which a plurality of players alternately place predetermined panels on a predetermined game field, thereby playing against each other, the game apparatus comprising game field display means (21, 27), panel display means (21, 27), panel selection means (21, 15), square selection means (21, 15), panel placing means (21), combined state determination means (21) and evaluation means (21). The game field display means displays, on a screen, a game field comprising a plurality of squares. The panel display means displays, on the screen, the panels which are respectively associated with the plurality of players and each of which is provided with one or more connecting portions for forming a combined state with another panel. The panel selection means selects, based on an operation performed by each player, a corresponding one of the panels. Based on an operation performed by said each player, the square selection means selects, from the game field, a square on which the corresponding one of the panels is to be placed. The panel placing means places, on the square selected by the square selection means, the corresponding one of the panels which has been selected by the panel selection means. The combined state determination means determines whether or not panels, associated with a same player, among a plurality of panels placed on the game field have formed a predetermined combined state via the connecting portions. The evaluation means evaluates the predetermined combined state which the combined state determination means has determined to have been formed.

The tenth aspect provides the same effect as that of the first aspect.

According to the present embodiment, a novel and highly strategic player-versus-player game is provided.

These and other, features, aspects and advantages of the present embodiment will become more apparent from the following detailed description of the present embodiment when taken in conjunction with the accompanying drawings.

BRIEF DESCRIPTION OF THE DRAWINGS

FIG. 26 is a diagram for describing the setting of placement permission flags;

DESCRIPTION OF THE PREFERRED EMBODIMENTS

Hereinafter, an embodiment will be described with reference to the drawings. Note that, the present embodiment is not limited to this embodiment.

Figure 1:
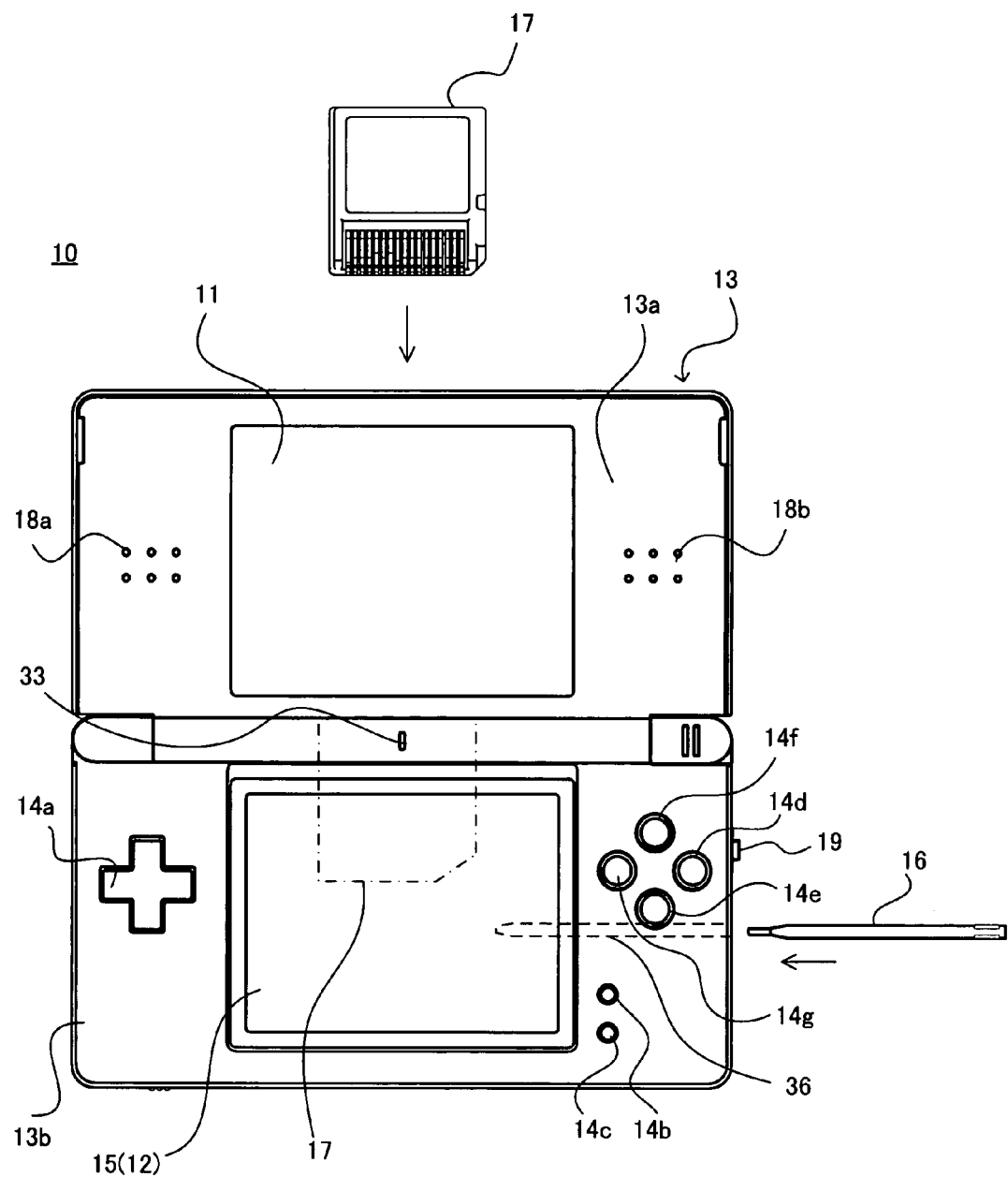
FIG. 1 is an external view of a handheld game apparatus 10 according to an embodiment.
Figure 2:
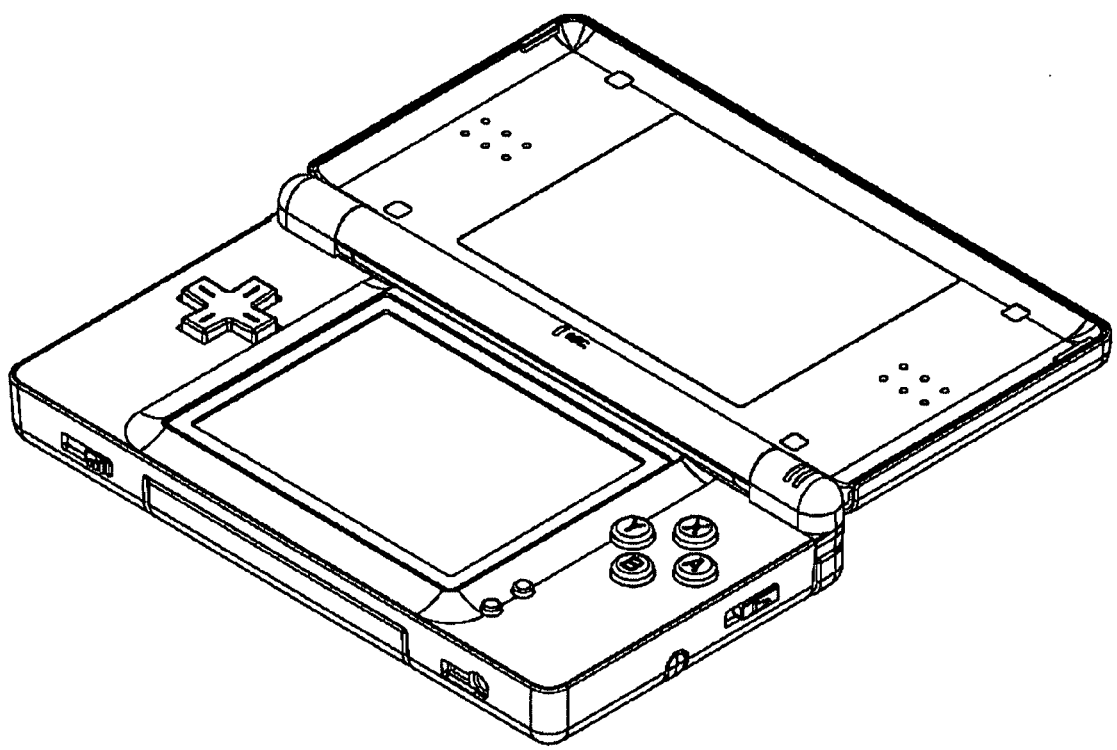
FIG. 2 is a perspective view of the handheld game apparatus 10 according to the embodiment of FIG. 1.

FIG. 1 is an external view of a handheld game apparatus 10 according to the embodiment presented herein. FIG. 2 is a perspective view of the handheld game apparatus 10. In FIG. 1, the game apparatus 1 includes a first LCD (Liquid Crystal Display) 11 and a second LCD 12. A housing 13 comprises an upper housing 13a and a lower housing 13b, and the first LCD 11 is accommodated in the upper housing 13a, and the second LCD 12 is accommodated in the lower housing 13b. Resolutions of the first LCD 11 and second LCD 12 are both 256 dots×192 dots. Note that, although an LCD is used as a display device in the present embodiment, any other display devices such as a display device using the EL (Electro Luminescence) may be used. Also, the resolutions of the first LCD 11 and second LCD 12 may be at any level.

The upper housing 13a is provided with sound holes 18a and 18b for outputting sounds from a later-described pair of loudspeakers (30a and 30b shown in FIG. 3) to the exterior.

A microphone opening 33 is provided at a hinge portion which connects the upper housing 13a and lower housing 13b in an openable and closable manner.

The lower housing 13b is provided with input devices as follows; a cross switch 14a, a start switch 14b, a select switch 14c, an "A" button 14d, a "B" button 14e, an "X" button 14f and a "Y" button 14g. In addition, a touch panel 15 is provided on a screen of the second LCD 12 as another input device. The lower housing 13b further includes a power switch 19, an insertion opening for accommodating a memory card 17, and an insertion opening for accommodating a stylus pen 16.

The touch panel 15 is of a resistive film type. However, the touch panel 15 of the present invention is not limited to the resistive film type. The touch panel may be of an arbitrary press-type touch panel. The touch panel 15 may be operated using a finger instead of the stylus pen 16. The touch panel 15 used in the present embodiment has the same resolution at 256 dots×192 dots (detection accuracy) as that of the second LCD 12. However, the resolutions of the touch panel 15 and the second LCD 12 may not necessarily be consistent with each other.

The memory card 17 is a storage medium having a game program stored therein, and placed in the insertion slot provided at the lower housing 13b in a removable manner.

Next, an internal configuration of the handheld game apparatus 10 will be described with reference to FIG. 3.

Figure 3:
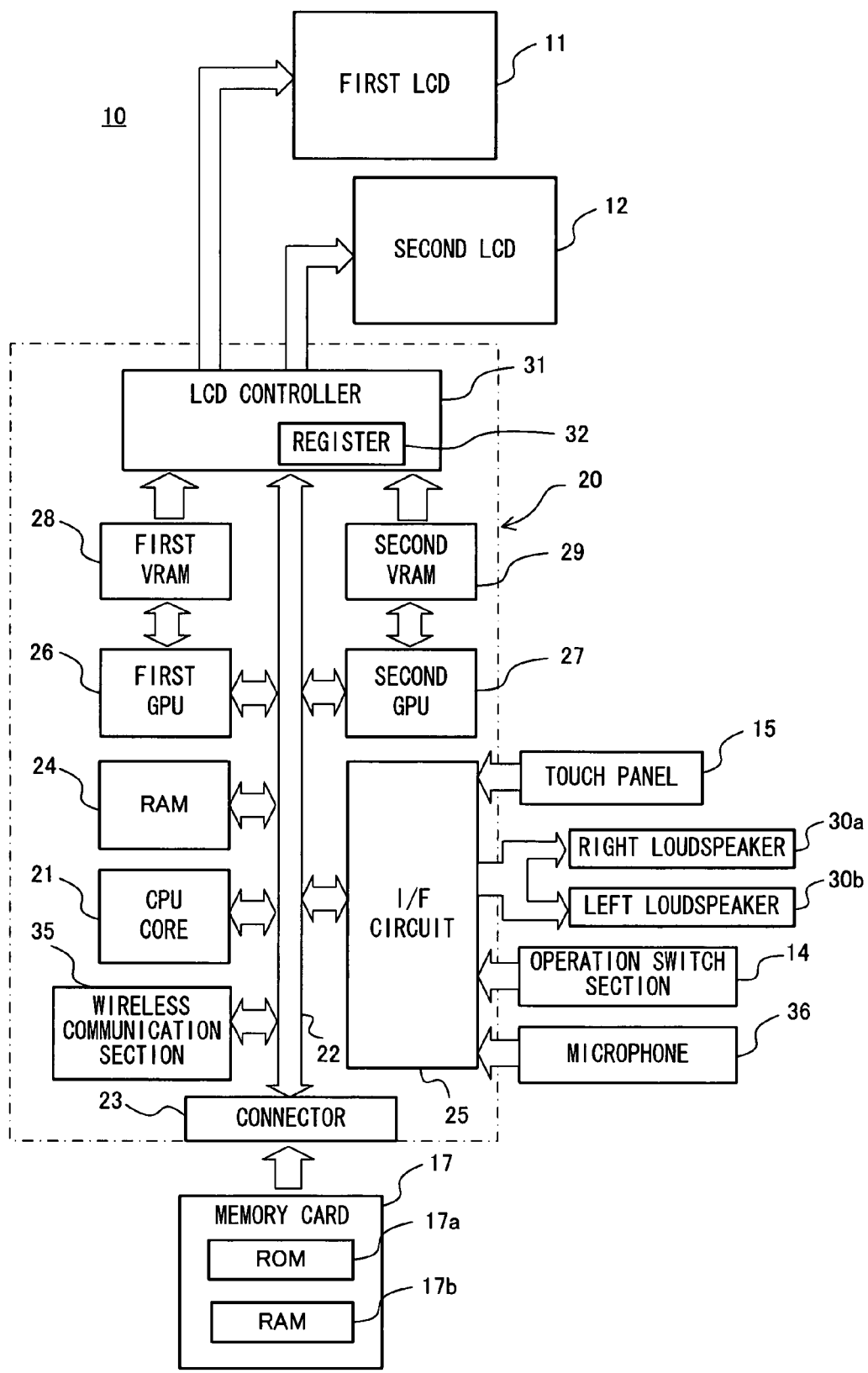
FIG. 3 is a block diagram showing the handheld game apparatus 10 according to the embodiment of FIG. 1.

In FIG. 3, a CPU core 21 is mounted on an electronic circuit board 20 which is to be housed in the housing 13. Via a bus 22, the CPU core 21 is connected to a connector 23, an input/output interface circuit (shown as I/F circuit in the diagram) 25, a first GPU (Graphics Processing Unit) 26, a second GPU 27, a RAM 24, an LCD controller 31 and a wireless communication section 35. The memory card 17 is connected to the connector 23 in a removable manner. The memory card 17 includes a ROM 17a for storing a game program and a RAM 17b for storing backup data in a rewritable manner. The game program stored in the ROM 17a of the memory card 17 is loaded to the RAM 24, and the game program having been loaded to the RAM 24 is executed by the CPU core 21. In addition to the game program, the RAM 24 stores, e.g., temporary data, which is obtained when the CPU core 21 executes the game program, and data for generating game images. Connected to the I/F circuit 25 are the touch panel 15, the right loudspeaker 30a, the left loudspeaker 30b, an operation switch section 14 comprising the cross switch 14a, the "A" button 14d, and a microphone 36. The right loudspeaker 30a and the left loudspeaker 30b are provided inside the sound holes 18a and 18b, respectively. The microphone 36 is provided inside the microphone opening 33.

A first VRAM (Video RAM) 28 is connected to the first GPU 26, and a second VRAM 29 is connected to the second GPU 27. In accordance with an instruction from the CPU core 21, the first GPU 26 generates a first game image based on data used for game image generation which is stored in the RAM 24, and writes the first game image into the first VRAM 28. The second GPU 27 also follows an instruction from the CPU core 21 to generate a second game image, and writes the second game image into the second VRAM 29. The first VRAM 28 and the second VRAM 29 are connected to the LCD controller 31.

The LCD controller 31 includes a register 32. The register 32 stores a value of either 0 or 1 in accordance with an instruction from the CPU core 21. When the value of the register 32 is 0, the LCD controller 31 outputs to the first LCD 11 the first game image which has been written into the first VRAM 28, and outputs to the second LCD 12 the second game image which has been written into the second VRAM 29. When the value of the register 32 is 1, the first game image which has been written into the first VRAM 28 is outputted to the second LCD 12, and the second game image which has been written into the second VRAM 29 is outputted to the first LCD 11.

The wireless communication section 35 has functions for exchanging, with the wireless communication section 35 of another game device, data used for game processing and other data.

Note that, the present invention is applicable not only to a game apparatus but also to an arbitrary apparatus having a press-type touch panel supported by a housing, e.g., to a handheld game apparatus, a controller of a stationary game apparatus, and a PDA (Personal Digital Assistant). The present invention is also applicable to an input device whose touch panel does not have a display screen provided thereunder.

Next, a game which is assumed in the present embodiment will be briefly described with reference to FIGS. 4 to 15. The game assumed in the present embodiment is a player-versus-player board game. In this game, players alternately place, on a square-patterned field, panels each having a number written thereon (hereinafter, referred to as 'cards'), whereby each player arrange numbers so as to form a predetermined card combination called 'yaku'. Each time a 'yaku' is formed, points are added to a score of a player who has formed the 'yaku'. A player whose points have first reached predetermined points becomes a winner.

The present embodiment describes an exemplary case where two players play against each other. Each player holds the handheld game apparatus 10. A later-described game image is displayed on the second LCD 12 of each handheld game apparatus 10. Each player operates his/her handheld game apparatus 10, and operation data, game data and the like thereof are transmitted to the handheld game apparatus 10 of the other player. Each handheld game apparatus 10 uses received data for game processing, whereby the handheld game apparatuses synchronize with each other in terms of game progress. Thus, processing for the player-versus-player board game proceeds while the handheld game apparatuses transmit to and receive from each other the game data. Note that, three or more players may play the game against each other.

Figure 4:
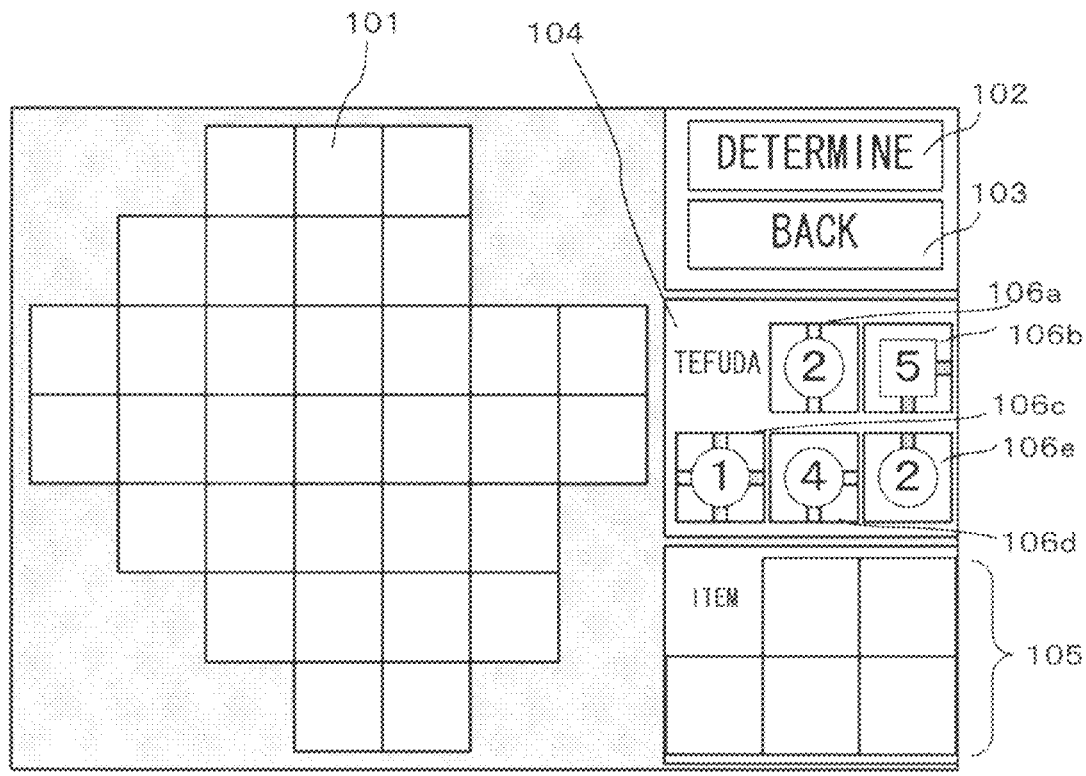
FIG. 4 is an exemplary display of a game assumed in the present embodiment.

FIG. 4 shows an exemplary display of the player-versus-player game assumed in the present embodiment. The game display of FIG. 4 shows a square-patterned field 101. Also, a determine button 102, back button 103, card stock field 104 and an item field 105 are displayed to the right of the field 101. In the card stock field 104, a card 106a, 106b, 106c, 106d and 106e are displayed. In the present embodiment, up to five cards are displayed in the card stock field 104. Hereinafter, cards currently displayed in the card stock field 104 will be referred to as 'tefuda cards'.

Figure 5:
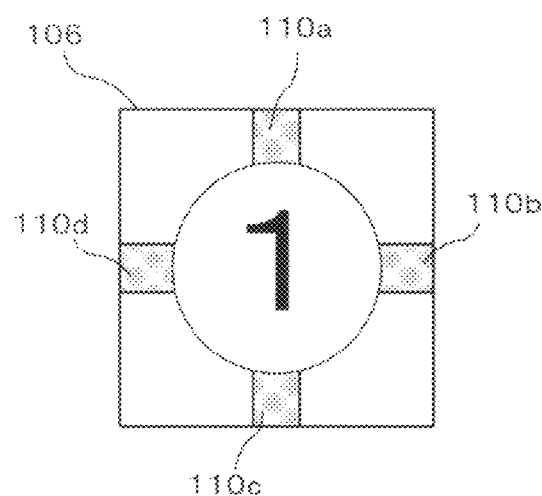
FIG. 5 is an example of a card assumed in the present embodiment.

FIG. 5 shows a tefuda card 106 in detail. Tefuda cards 106 each have an approximately quadratic shape. A number encompassed by a circle is drawn at the center of each tefuda card 106, and connecting portions 110 are respectively drawn in four directions from the number. To be specific, the connecting portions 110 are drawn so as to connect the circle, within which the number is written, and a central portion of each of upper, lower, left and right sides of the tefuda card 106. Here, the number of connecting portions 110 is from 1 to 4. In other words, in the case of the minimum number of connecting portions 110, there is only one connecting portion 110 drawn in any one of the four directions, whereas in the case of the maximum number of connecting portions 110, there are connecting portions 110 drawn in all the four directions.

In this player-versus-player game, there are two types of cards which are referred to as 'color cards' and 'rainbow card'. The 'color cards' are colored such that each player is allocated with a particular color. For example, blue is allocated to a player 1, and red is allocated to a player 2. This allows each player to recognize whether a tefuda card placed on the field 101 is his/her card or the other player's card. As a general rule of this game, each player can form a 'yaku' by 'combining' his/her color cards. The 'rainbow card' is combinable to the color card of any player. In other words, any player is allowed to use the rainbow card to form a 'yaku'. The rainbow card is displayed by using a color and image which are different from those of each color card so that the rainbow card may be distinguished from the color cards.

Figure 6:
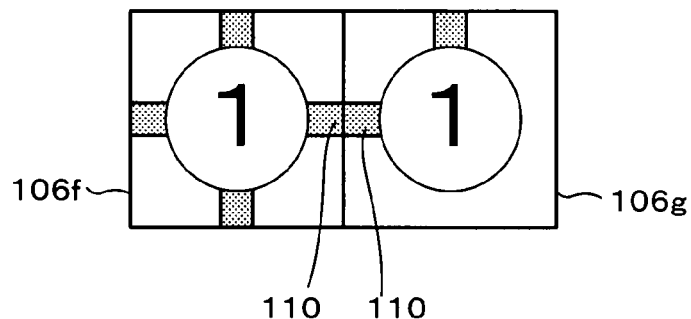
FIG. 6 is a diagram for describing a combination of cards in the present embodiment.
Figure 7:
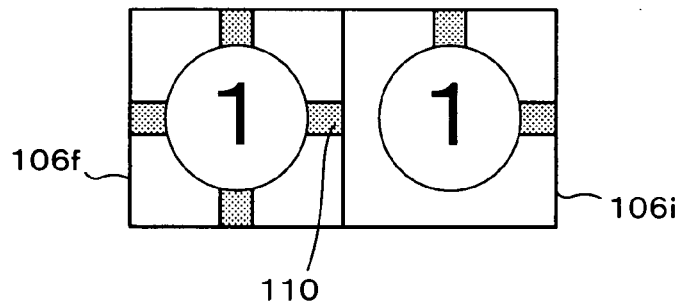
FIG. 7 is a diagram for describing a combination of cards in the present embodiment.
Figure 8:
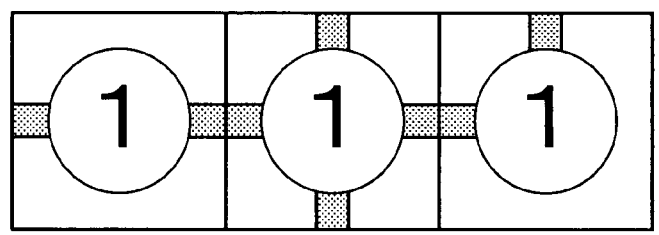
FIG. 8 is an example of 'same number combination' which is a 'yaku' of the present embodiment.
Figure 9:
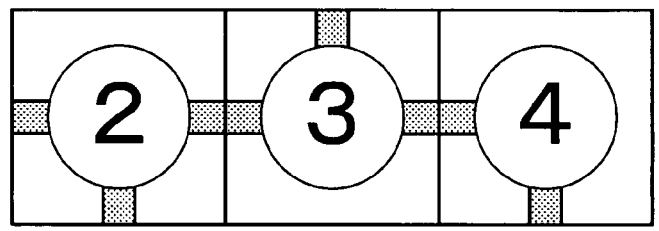
FIG. 9 is an example of 'sequential number combination' which is a 'yaku' of the present embodiment.
Figure 10:
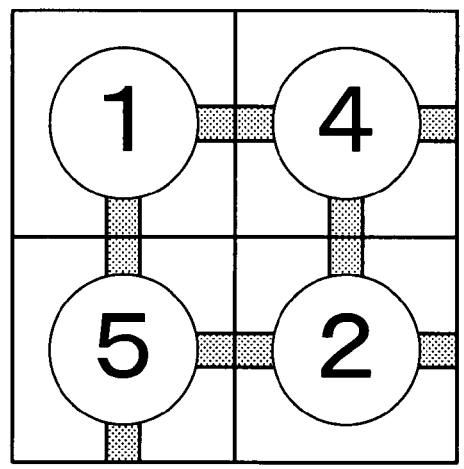
FIG. 10 is an example of 'encompassing combination' which is a 'yaku' of the present embodiment.

Next, 'yaku' and 'combine' in this player-versus-player game will be described. In this player-versus-player game, each player is required to combine his/her color cards as a precondition to form a "yaku". For example, the player 1 is required to combine two or more blue cards, and the player 2 is required to combine two or more red cards (here, the rainbow card may be used as described above). FIGS. 6 and 7 illustrate the aforementioned 'combine'. In the present embodiment, 'combined' refers to a state where the connecting portions 110 are connected to each other. FIG. 6 shows a state where two cards are combined with each other. Whereas, FIG. 7 shows a state where two cards are not combined with each other. In FIG. 6, tefuda cards 106f and 106g are laterally adjacent to each other, and the connecting portion 110 at the right side of the tefuda card 106f is connected to the connecting portion 110 at the left side of the tefuda card 106g. This is a state where these two cards are 'combined' with each other. In FIG. 7, on the other hand, although tefuda cards 106f and 106i are adjacent to each other and the connecting portion 110 is present at the right side of the tefuda card 106f, the connecting portion 110 is not present at the left side of the tefuda card 106i. Thus, although the tefuda cards are adjacent to each other, the connecting portions thereof are not connected with each other. This is a state where these two cards are not 'combined' with each other.

Figure 11:
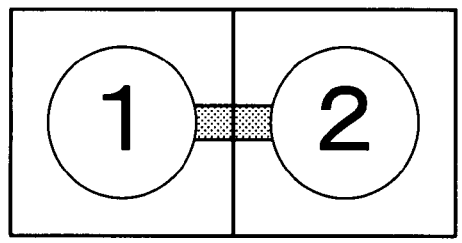
FIG. 11 is an example of 'perfect combination' which is a 'yaku' of the present embodiment.

As shown in FIGS. 8 to 11, in this player-versus-player game, there are the following four types of 'yaku', in each of which cards are in such a 'combined' state as described above.
(1) Same number combination: a state where cards having a same number thereon are combined (FIG. 8)
(2) Sequential number combination: a state where numbers on combined cards are arranged in an ascending or descending order (FIG. 9)
(3) Encompassing combination: a state where cards are combined such that connecting portions thereof are connected in a ring-shaped manner (FIG. 10)
(4) Perfect combination: a state where cards are combined such that none of the connecting portions thereof are unconnected (FIG. 11)

Figure 12:
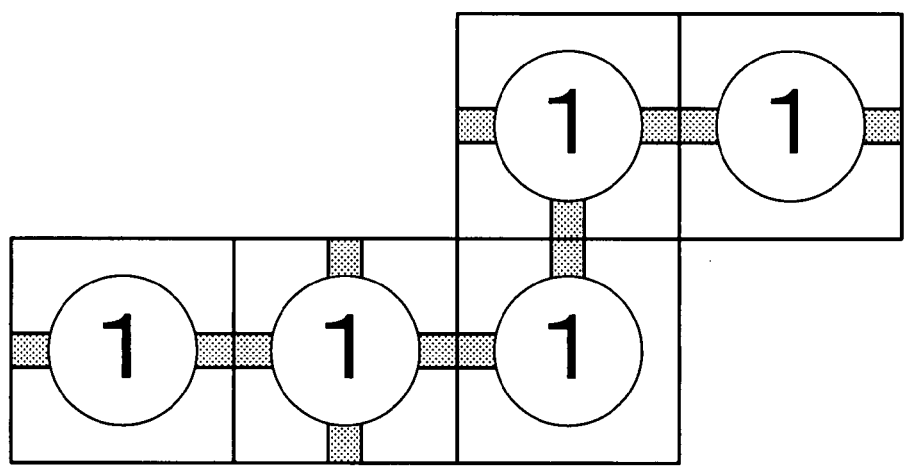
FIG. 12 is an example of 'same number combination' which is a 'yaku' of the present embodiment.
Figure 13:
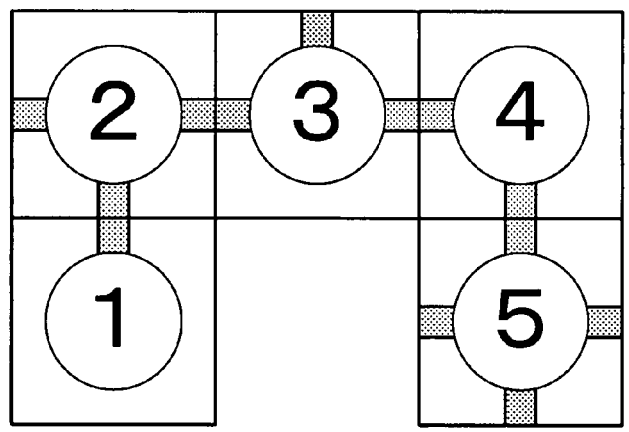
FIG. 13 is an example of 'sequential number combination' which is a 'yaku' of the present embodiment.
Figure 14:
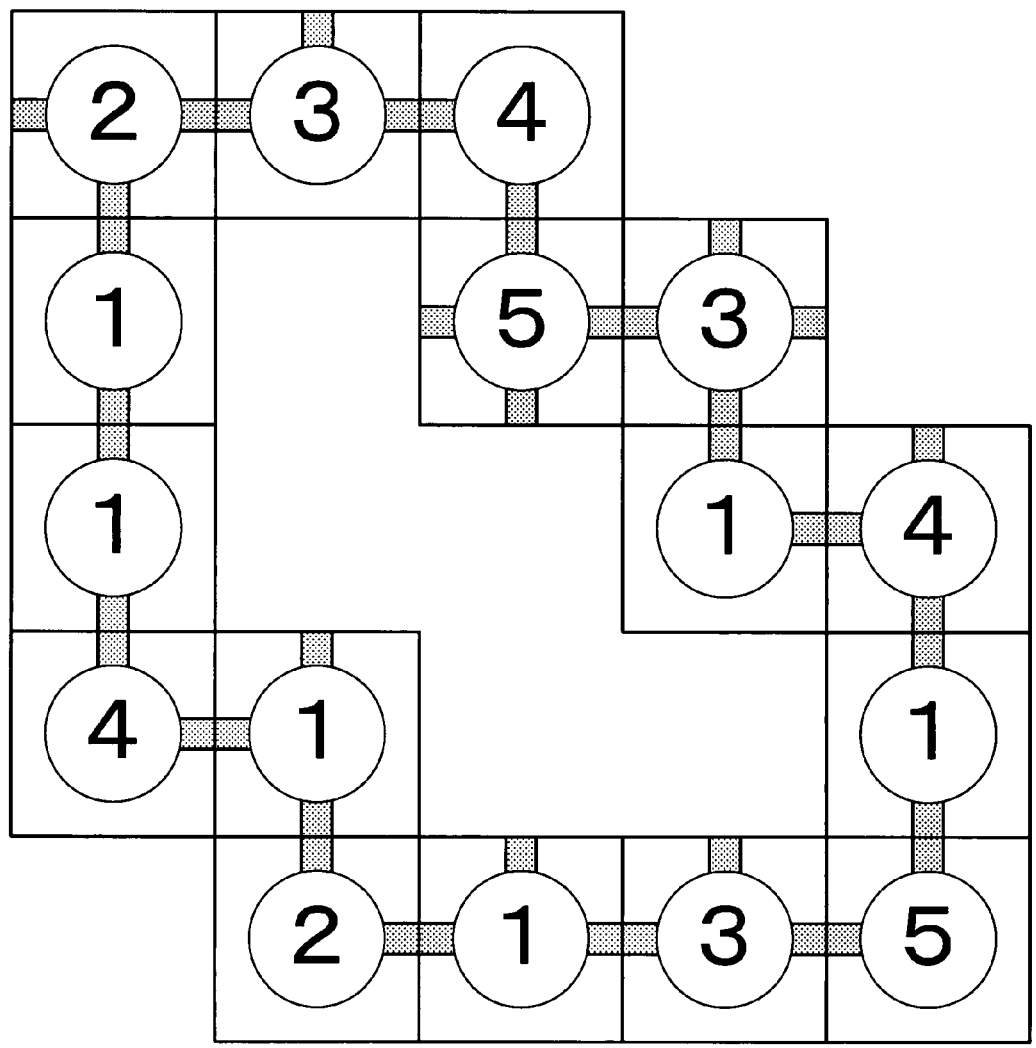
FIG. 14 is an example of 'encompassing combination' which is a 'yaku' of the present embodiment.

Note that, the above combined states are not necessarily linear combined states. For example, in the case of same number combination, even if the combined state of the cards includes a curve as shown in FIG. 12, the same number combination is formed as long as the cards have a same number thereon. Similarly, in the case of sequential number combination, the combined state of the cards may include a curve as shown in FIG. 13. The sequential number combination is formed as long as the numbers on the cards are arranged in an ascending or descending order. In the case of encompassing combination, the combined state of the cards is only required to be ring-shaped as shown in FIG. 14, and a shape of the ring is not limited to a particular shape.

Next, a proceeding flow of the player-versus-player game will be described. When a player takes his/her turn, the player adds one tefuda card to the card stock field 104 (since there are already five tefuda cards in the card stock field 104 at his/her first turn, the player is not required to add a tefuda card at his/her first turn), and then performs, when the player intends to use an item displayed in the item field 105 (not shown; the item is acquired by the player during the game as necessary, and appropriately displayed in the item field 105), an operation to use the desired item (e.g., touch the desired item). It is understood that the player is not required to perform this operation when the player has no intention to use such an item.

Next, the player selects a desired tefuda card 106 from the card stock field 104 (e.g., perform a touch operation on the desired tefuda card 106 by using the stylus pen 16). Then, the player places the desired tefuda card 106 on a desired square on the field 101 (e.g., perform a touch operation on the desired square). Subsequently, a movement of the selected tefuda card 106 is displayed in animation from when the card 106 is moved from the card stock field 104 to when the card 106 is placed on the selected square. At this point, a position on which the tefuda card 106 is to be placed has not been fixed yet. Hereinafter, a placement of the tefuda card at this point will be referred to as a provisional placement. In the present embodiment, there are limitations, as described below, regarding a position on which the player is allowed to place the tefuda card. The player is only allowed to place a color card on a position which is 'adjacent to his/her color card', or 'adjacent to a rainbow card'. Whereas the player is allowed to place a rainbow card on 'any vacant square other than a vacant square which is only adjacent to a square on which a color card of an opponent player is placed'. Note that, only when the player takes his/her first turn, there are no limitations regarding a position on which the player is allowed to place the tefuda card. In other words, when the player takes his/her first turn, the player is allowed to place the tefuda card on any vacant square whether the tefuda card is a color card or a rainbow card.

Figure 15A:
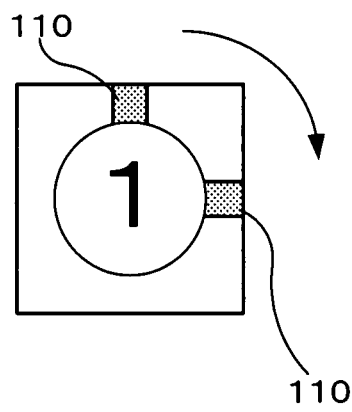
FIG. 15 shows a rotation of a card.
Figure 15B:
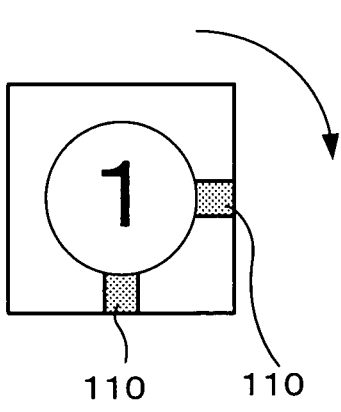
Figure 15C:
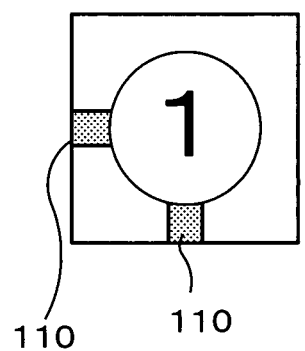

When the provisional placement is completed, the player rotates the provisionally placed tefuda card to determine an orientation in which the tefuda card is to be placed. In this player-versus-player game, each time the player touches the provisionally placed tefuda card 106, the player can rotate the tefuda card 106 to the right by 90 degrees. FIG. 15 illustrates an operation to rotate the tefuda card 106. A card shown in FIG. 15A is provided with connecting portions 110 at the upper and right sides of the card. When the player touches the card once, the connecting portions 110 change the positions thereof to the right and lower sides of the card as shown in FIG. 15B. When the player touches the card again, the connecting portions 110 change the positions thereof to the lower and left sides of the card as shown in FIG. 15C. Such a rotation operation allows the player to change the positions of the connecting portions 110. As a result, the tefuda card 106 becomes more connectable to other cards. When the orientation in which the tefuda card 106 is to be placed is determined, the player presses the determine button 102. In this manner, a placement position and placement orientation of the tefuda card 106 are determined. Hereinafter, the above placement performed through the determine button 102 will be referred to as a fixed placement. Also, the tefuda card which is fixedly placed on the field 101 will be referred to as a placement card.

After the fixed placement is completed, it is determined, with respect to the fixedly placed placement card, whether or not such a 'yaku' as described above has been formed. When a 'yaku' has been formed, points corresponding to the 'yaku' are added to the player's score. Then, the player's turn ends, and the opponent player takes his/her turn.

As described above in the present embodiment, players alternately place, on the field, cards which are provided with the connecting portions 110. Game processing, such as determining whether a yaku has been formed and adding points, is performed based on a connection state of the connecting portion 110 of each placement card (i.e., combined state of placement cards). Such processing based on the combined state is used for the player-versus-player board game. This makes it possible to provide the novel player-versus-player board game which requires players to play in a more strategic manner as compared to, e.g., a puzzle game which simply requires a player to arrange panels, which strategic manner is, e.g., hindering an opponent player from forming a yaku, and placing cards in a planned manner so as to form a high-scoring yaku.

Figure 16:
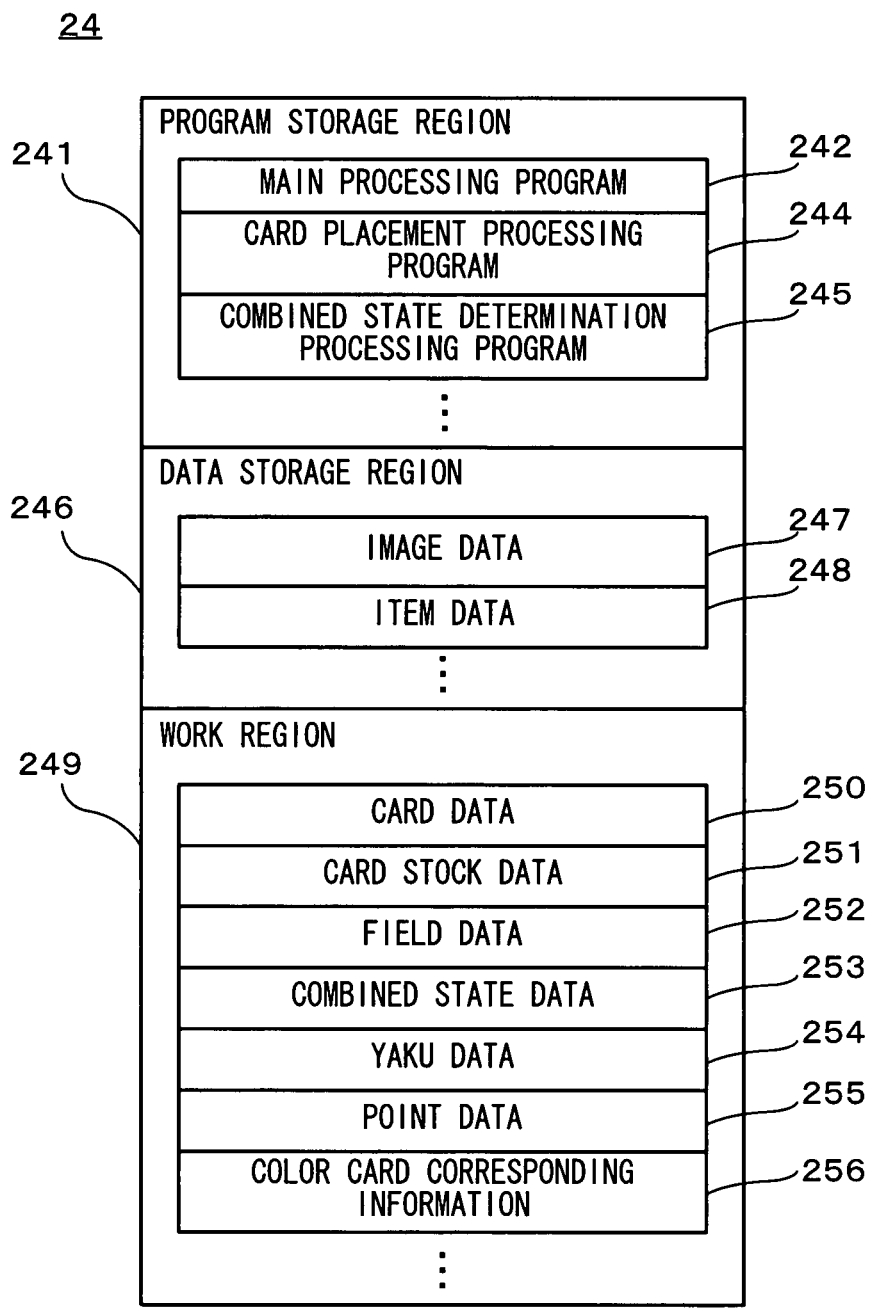
FIG. 16 is a memory map illustrating a memory space of a RAM 24 of FIG. 3.

Next, various pieces of data used in the present embodiment will be described. FIG. 16 illustrates a memory map of the RAM 24 shown in FIG. 3. In FIG. 16, the RAM 24 includes a program storage region 241, data storage region 246 and work region 249. Pieces of data in the program storage region 241 and data storage region 246 are those prestored in the ROM 17a of the memory card 17 and copied from the ROM 17a to the RAM 24.

The program storage region 241 stores a game program to be executed by the CPU core 21, the game program comprising a main processing program 242, card placement processing program 244, combined state determination processing program 245 and the like. The main processing program 242 corresponds to a process illustrated by a later-described flowchart of FIG. 21. The card placement processing program 244 is a program for causing the CPU core 21 to perform a process for allowing each player to place a card. The combined state determination processing program 245 is a program for causing the CPU core 21 to perform a process for determining a combined state of cards as shown in, e.g., FIG. 6.

The data storage region 246 stores image data 247, item data 248 and the like which are necessary for the game. The image data 247 is image data of a game field, cards, items and the like which are displayed in the game. The item data 248 indicates effects of the items used in the game.

The work region 249 stores various pieces of data, which are temporarily used for the game processing, such as card data 250, card stock data 251, field data 252, combined state data 253, yaku data 254, point data 255, color card corresponding information 256 and the like.

Figure 17:
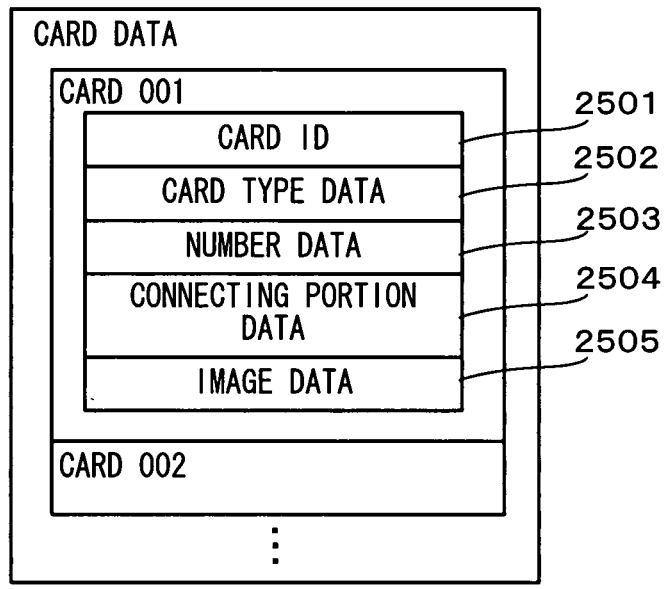
FIG. 17 shows an exemplary data structure of card data 250.

The card data 250 is master data about each card used during the game. The master data is generated, as necessary, at the start of game or during player-versus-player game processing, and then stored as the card data 250. The handheld game apparatuses transmit to and receive from each other the card data 250 as necessary, thereby synchronizing with each other when the players play against each other. FIG. 17 shows an exemplary data structure of the card data 250. Data about each card contained in the card data 250 comprises a card ID 2501, card type data 2502, number data 2503, connecting portion data 2504 and image data 2505.

The card ID 2501 is an ID for uniquely identifying a corresponding card. The card type data 2502 indicates whether the corresponding card is the aforementioned color card or rainbow card. In the case where the card is a color card, the card type data 2502 contains color data indicating a color in which the color card is displayed. The card type data 2502, by being used together with later-described color card corresponding information 256, identifies a player with whom the color card is associated. The number data 2503 indicates a number which is displayed on the card. In the present embodiment, the number is an integer from 1 to 5.

The connecting portion data 2504 indicates the number of connecting portions provided on the card and positions in which the connecting portions are provided. In other words, this data is a parameter used for determining whether cards are combined. As shown in FIG. 5 in the present embodiment, the connecting portions 110 are provided in the four directions at a maximum, i.e., upper, lower, left and right directions, from the card (i.e., provided at the central portion of each of the upper, lower, left and right sides of the card). Accordingly, these four directions are represented by four bits, for example. Each bit is recognized as follows: 0=connecting portion is present; 1=connecting portion is not present. For example, when the connecting portions 110 are respectively provided at the upper and left sides of the card, the connecting portions are represented as '1010'. The image data 2505 is image data of the card. This image data 2505 is a part of the image data 247, which part is copied from the data storage region 246 as necessary.

Figure 18:
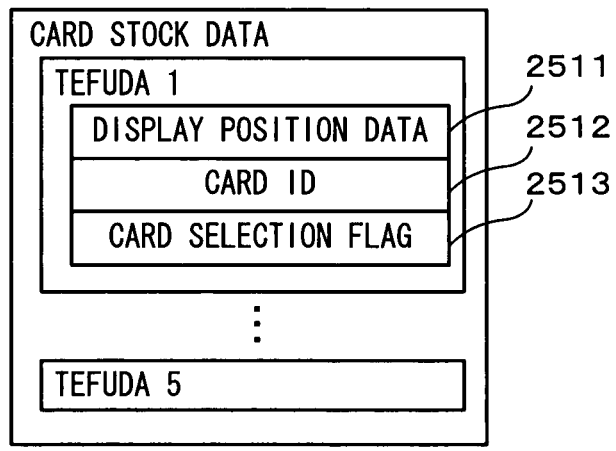
FIG. 18 shows an exemplary data structure of card stock data 251.

The card stock data 251 corresponds to the card stock field 104 in the above-described game display of FIG. 4. FIG. 18 shows an exemplary data structure of the card stock data 251. Since the card stock contains five cards at a maximum in the present embodiment, the card stock data 251 contains data about five tefuda cards (tefuda card 1 to tefuda card 5). The data about each tefuda card comprises display position data 2511, a card ID 2512 and a card selection flag 2513.

The display position data 2511 indicates a position on the card stock field 104, in which position a corresponding tefuda card 106 is displayed. The card ID 2512 corresponds to the card ID 2501 of the card data 250. The card selection flag 2513 is a flag for indicating which tefuda card 106 has been selected by the player from the card stock field 104.

Figure 19:
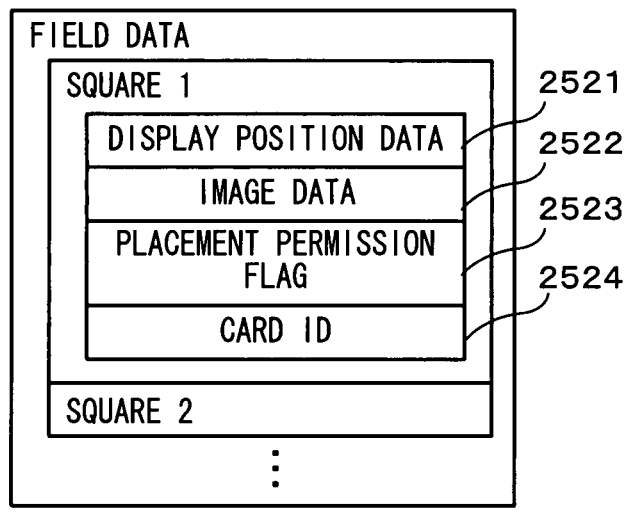
FIG. 19 shows an exemplary data structure of field data 252.

The field data 252 corresponds to the field 101 of the above-described game display of FIG. 4. The field data 252 contains data of each of the squares forming the field 101. FIG. 19 shows an exemplary data structure of the field data 252. The data of each square comprises display position data 2521, image data 2522, a placement permission flag 2523 and a card ID 2524.

The display position data 2521 indicates a display position of a corresponding square, and is used as data for identifying a position of the square on the field 101. The image data 2522 is image data of a content of the square, which is displayed on the screen. Before a tefuda card is placed on the square, image data of a vacant square is stored as the image data 2522, and after the tefuda card is placed on the square, image data of the placed tefuda card is stored as the image data 2522. The placement permission flag 2523 indicates whether or not a tefuda card is placeable on the square. When the placement permission flag 2523 is set to ON, a tefuda card is placeable on the square, whereas when the placement permission flag 2523 is set to OFF, a tefuda card is not placeable on the square. The card ID 2524 indicates a card placed on the square, and corresponds to the card ID 2501 of the card data 250. Note that, when no card is placed on the square, the card ID 2524 is set to a null value so as to indicate that no card is placed thereon.

Return to FIG. 16. The combined state data 253 indicates a combined state of placement cards placed on the field. For example, data indicating an overall shape of combined placement cards is stored as the combined state data 253. Alternatively, matrix data which corresponds to the field 101 may be stored as the combined state data 253, for example, and this matrix data only contains data of combined placement cards.

Yaku data 254 indicates whether or not such a yaku as shown in FIGS. 8 to 14 (i.e., predetermined combined state) has been formed. When a yaku has been formed, the number of placement cards forming the yaku is stored as the yaku data 254 for the purpose of point calculation.

Figure 20:
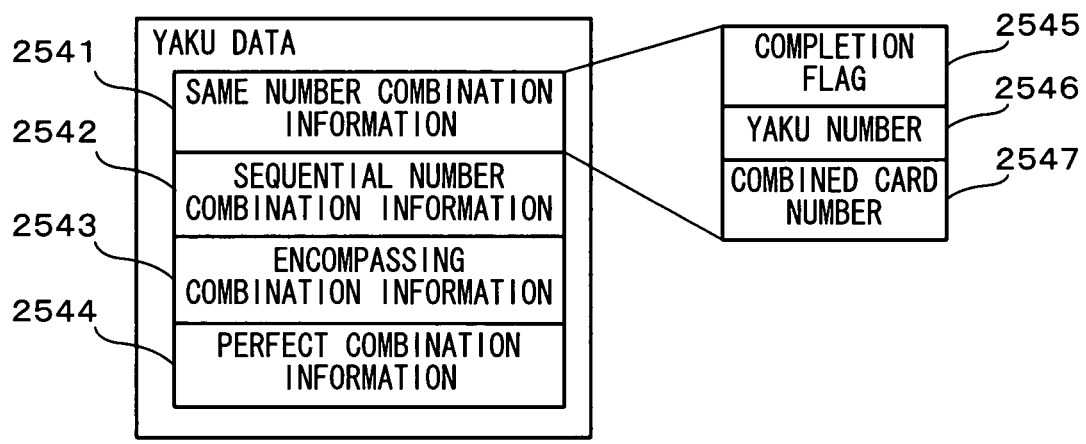
FIG. 20 shows an exemplary data structure of yaku data 254.

FIG. 20 shows an exemplary data structure of the yaku data 254. The yaku data 254 indicates details of each yaku, and the yaku data 254 comprises same number combination information 2541, sequential number combination information 2542, encompassing combination information 2543 and perfect combination information 2544. These information each include a completion flag 2545, yaku number 2546 and combined card number 2547. When the completion flag 2545 is set to ON, this indicates that at least one yaku has been formed. In the case where a plurality of same yakus are formed at the same time, the number of formed yakus are stored as the yaku number 2546. The number of placement cards forming a yaku is stored as the combined card number 2547. When there are a plurality of formed yakus, the number of placement cards is stored for each formed yaku.

Return to FIG. 16. Points acquired by the players are stored as point data 255 for each player. In other words, each player's handheld game apparatus stores points acquired by all the players including an opponent player. The reason for this is that in the present embodiment, each handheld game apparatus determines, based on the points, whether to have won or lost the game (Note that, there is no possibility that the handheld game apparatuses provide inconsistent win-loss determinations because, as described above, the handheld game apparatuses communicate with each other to synchronize with each other in terms of game progress).

The color card corresponding information 256 indicates a correspondence between each player playing the player-versus-player game and a color card (color of the color card) used by said each player.

Next, a player-versus-player board game process performed by the handheld game apparatus 10 will be described with reference to FIGS. 21 to 35. Note that, processing described below is performed by each of a plurality of handheld game apparatuses 10.

When power is supplied to the handheld game apparatus 10, the CPU core 21 of the handheld game apparatus 10 executes a boot program stored in a boot ROM which is not shown, thereby initializing each unit, e.g., the RAM 24. Next, various programs such as a main program and various data, which are stored in the memory card 17, are loaded into the RAM 24 via the connector 23, and then the main program starts to be executed.

Figure 21:
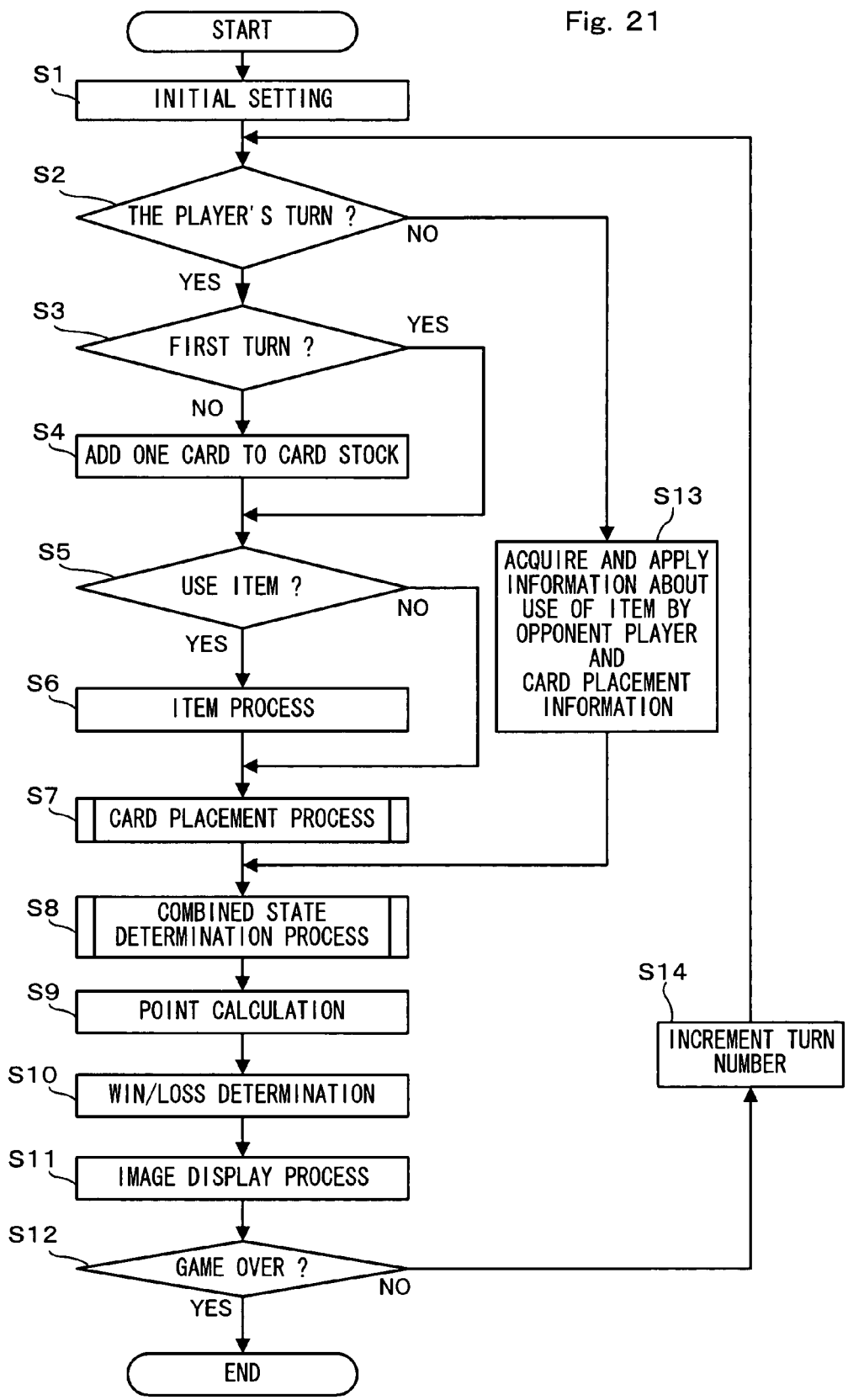
FIG. 21 is a flowchart showing a player-versus-player board game process according to an embodiment.

FIG. 21 is a flowchart showing the entire player-versus-player board game process performed by the handheld game apparatus 10. First, an initial setting process is performed at step S1. To be specific, various flags are set to OFF. Next, the 'color' of a color card used by each player is determined, and information associating the 'color', i.e., the color card, with each player is stored in the work region 249 as the color card corresponding information 256. Next, five tefuda cards 106 to be used at the start of the game are generated at random for the card stock field 104, and then stored as the card data 250, and also as the card stock data 251. Here, color information about images of color cards of respective players, which images are indicated by the image data 2505, is set such that the color cards are each displayed in a corresponding color. Next, details of the field 101 at the start of the game (i.e., the number of squares and a placement pattern of the squares) are determined. At this point, the details of the field 101 are determined while the handheld game apparatuses of the players playing against each other communicate with each other such that the same field 101 is generated by each of the handheld game apparatuses. Then, the determined details are stored as the field data 252. Further, an order in which the players take their turns is determined, and information about the order (not shown) is stored in the work region 249.

Then, a game space is created and displayed on the second LCD12. The CPU core 21 creates a two- or three-dimensional game space, and places the five cards, which have been generated as described above, on the card stock field 104 as initial cards. A game image of the game space created as above is generated, and the generated game image is displayed on the second LCD12. Thereafter, a loop of the processes at steps S2 to S14 is performed at each frame (except when a process at step S7 is performed), whereby the game proceeds.

Next, it is determined, based on the aforementioned information about the order, whether or not a turn of the player using the handheld game apparatus 10 has come (step S2). When a result of the determination indicates that the player's turn has not come yet (NO at step S2), the handheld game apparatus 10 receives information about use of an item by an opponent player and card placement information which are transmitted from the handheld game apparatus of the opponent player (step S13). In other words, the handheld game apparatus 10 acquires details of an operation performed by the opponent player. Furthermore, a process is performed for applying, to the game space of the player, the received details of the operation performed by the opponent player. For example, a process for placing and displaying, in the field 101 of the handheld game apparatus of the player, a color card placed by the opponent player is performed. Then, the processing proceeds to a later-described step S8. Note that, at step S13, when the opponent player is the CPU, the details of the operation to be performed by the opponent player are determined by executing a predetermined thinking routine program.

On the other hand, when the determination result at step S2 indicates that the player's turn has come (YES at step S2), it is determined whether or not it is the player's first turn (step S3). When a result of the determination indicates that it is not the player's first turn (NO at step S3), a process for adding a card to the card stock is performed (step S4). To be specific, the card data 250 for one card is randomly generated and stored. Further, the card ID 2512 of the generated card is stored to be contained in the card stock data 251 (i.e., the card ID 2512 of the generated card is stored in a vacant region among regions in which data of the cards 1 to 5 in the card stock are to be stored). When the result of the determination indicates that it is the player's first turn, the processing proceeds to a next step without performing the process at step S4 since five tefuda cards have been already provided by the initial setting process.

Next, it is determined whether or not the player has performed an operation to select an item (step S5). For example, it is determined whether or not the player has performed, within a predetermined time period, a double-tap operation on an item displayed in the item field 105. When a result of the determination indicates that the operation to select an item has been performed (YES at step S5), a process for using the item selected by the player is performed (step S6). To be specific, a process for acquiring, from the item data 248, data corresponding to the item selected by the player, and applying, to the game processing, an effect produced by the item, which effect is indicated by the acquired data, is performed. For example, a process for replacing all the cards in the card stock, or for changing numbers on cards which have been already placed on the field 101, is performed. On the other hand, when it is determined that the player has not performed the operation to select an item (NO at step S5), the processing proceeds to a next step without performing the process at step S6.

Figure 22:
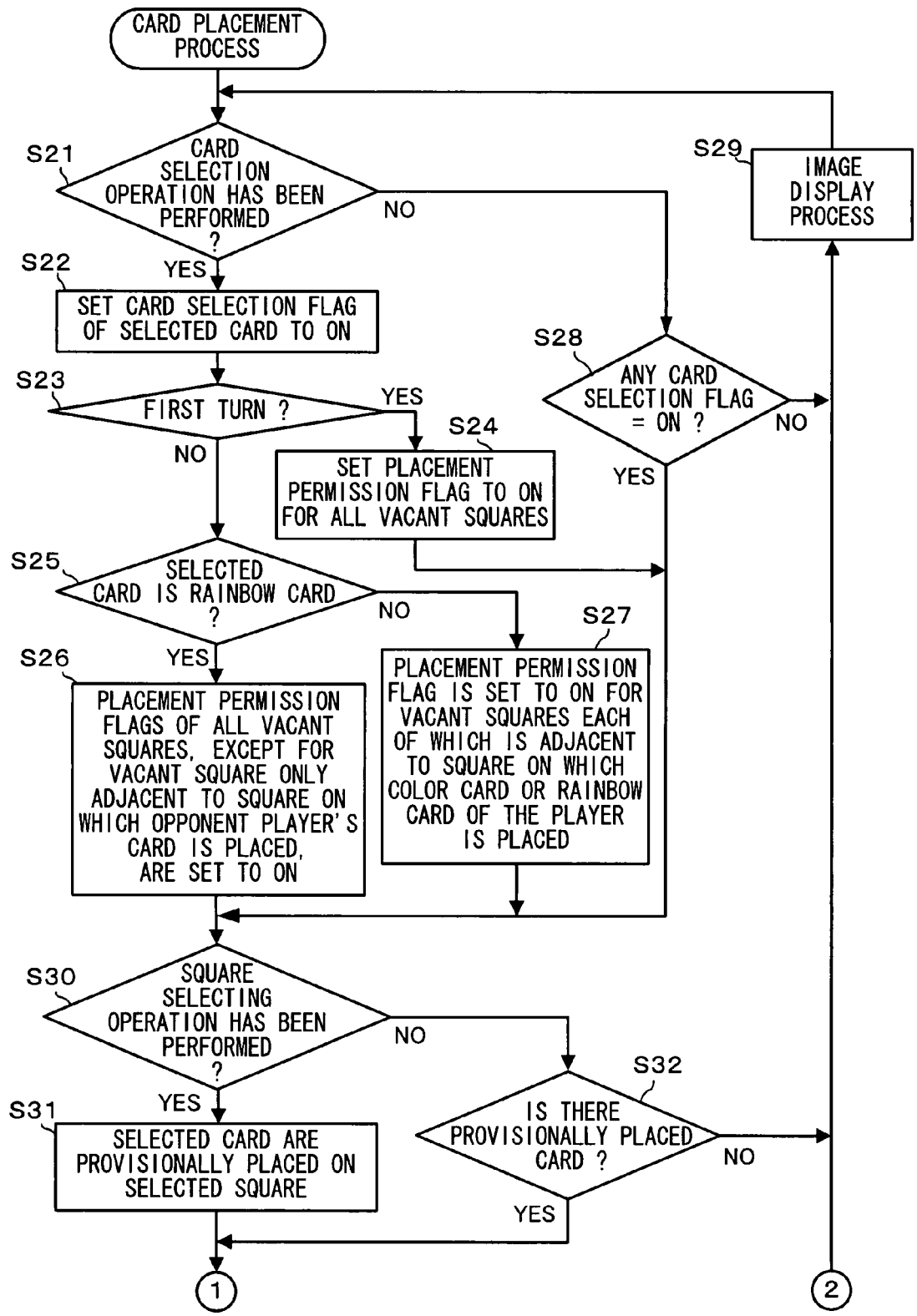
FIG. 22 is a flowchart showing in detail a card placement process at step S7 of FIG. 21.
Figure 23:
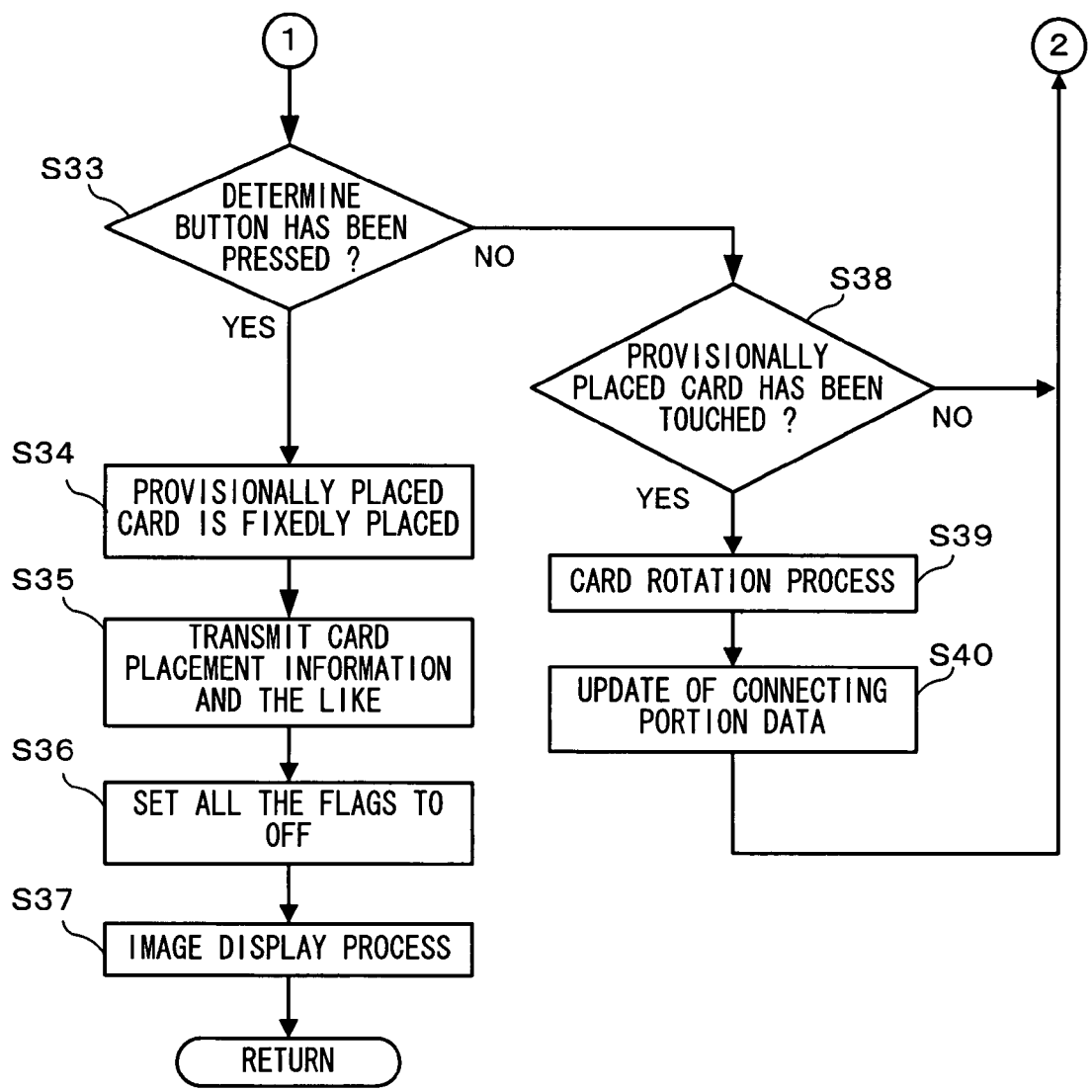
FIG. 23 is the flowchart showing in detail the card placement process at step S7 of FIG. 21.

Next, a card placement process, for selecting a desired tefuda card 106 from the card stock field 104 (see FIG. 4) and placing the selected card on the field 101 (step S7), will be described. FIGS. 22 and 23 illustrate a flowchart which shows in detail the card placement process of step S7. As shown in FIG. 22, it is first determined whether or not the player has performed an operation to select a tefuda card (step S21). To be specific, it is determined whether or not a touch operation has been performed on any tefuda card 106 displayed on the card stock field 104. When a result of the determination indicates that the operation to select a tefuda card has not been performed (NO at step S21), it is further determined whether or not the card selection flag 2513 of any of the tefuda cards of the card stock data 251 (i.e., tefuda cards on the card stock field 104) is ON (step S28). When a result of the determination indicates that the card selection flag 2513 of any of the tefuda cards is ON (YES at step S28), this means that said any of the tefuda cards has been previously selected, and therefore, the processing proceeds to a later-described step S30. On the other hand, when the result of the determination indicates that none of the tefuda cards has the card selection flag 2513 set to ON (NO at step S28), an image display process for generating a game image and displaying the game image on the second LCD12 is performed (step S29), because the card placement process is a loop of processes, and it is necessary to provide, each time the loop of processes is performed, a display on the screen in accordance with each performed process in the loop of processes. Then, the processing returns to step S21, and the card placement process is reiterated until any of the tefuda cards is selected.

On the other hand, when the determination result at step S21 indicates that any of the tefuda cards has been selected (YES at step S21), the card selection flag 2513 of the selected tefuda card is set to ON (step S22). If this is a case of switching a previously selected tefuda card with a newly selected tefuda card, the card selection flag 2513 of the previously selected tefuda card is set to OFF. Whether or not such a switch of the tefuda card has been performed is determined in the following manner: touch coordinates, which are obtained each time the tefuda card selecting operation is performed, are stored in the work region 249; and touch coordinates, which have been obtained by a previously performed tefuda card selecting operation, are compared with touch coordinates obtained by a most recently performed tefuda card selecting operation, whereby whether or not selected tefuda cards are the same is determined.

Next, it is determined whether or not the player is taking his/her first turn (step S23). When a result of the determination indicates that the player is taking his/her first turn, the placement permission flag 2523 is set to ON for all the vacant squares of the field 101 (step S24). To be specific, the field data 252 is accessed, and data of a square whose card ID 2524 is currently set to NULL is searched for. Then, the placement permission flag 2523 contained in the data of a square, which data is found as a result of the search, is set to ON. Thereafter, the processing proceeds to a later-described step S30.

On the other hand, when the result of the determination indicates that the player is not taking his/her first turn (NO at step S23), it is further determined whether or not the selected tefuda card is a rainbow card (step S25). To be specific, the card data 250 is searched based on the card ID 2512 of the selected tefuda card, and then the card type data 2502 of a card corresponding to the card ID 2512 is obtained. Thereafter, it is determined whether or not the card type data 2502 indicates a rainbow card.

Figure 24:
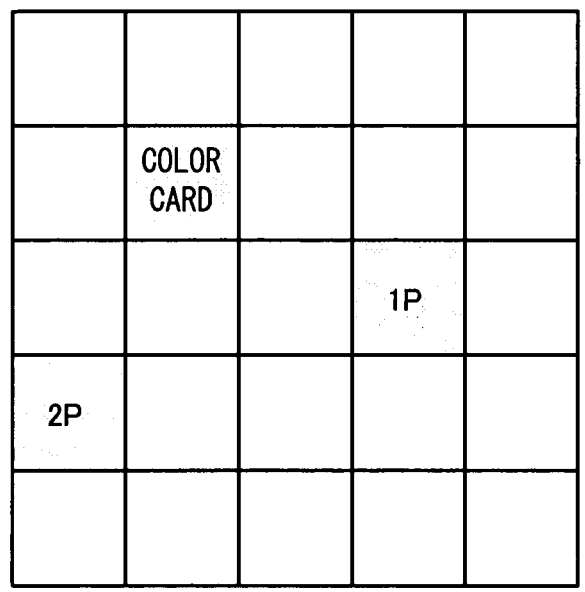
FIG. 24 is a diagram for describing setting of placement permission flags.
Figure 25:
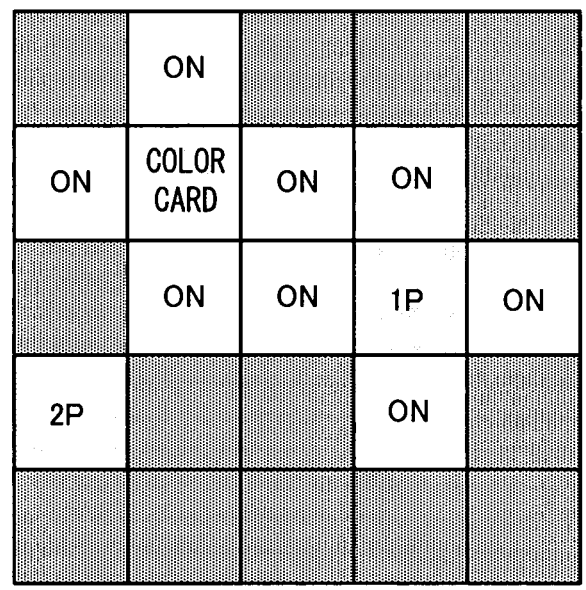
FIG. 25 is a diagram for describing the setting of placement permission flags.

When a result of the determination indicates that the selected tefuda card is a rainbow card (YES at step S25), placement permission flags 2523 of all the vacant squares, except for a vacant square only adjacent to a square on which the color card of the opponent player is placed, are set to ON (step S26). On the other hand, when the result of the determination indicates that the selected tefuda card is not a rainbow card (NO at step S25), i.e., when the selected tefuda card is a color card (NO at step S25), the placement permission flag 2523 is set to ON for vacant squares each of which is adjacent to a square on which a color card or rainbow card, among placement cards placed in the field 101, of the player is placed (step S27). This process will be described with reference to FIGS. 24 to 26. For example, in the case where the player 1 takes his/her turn and selects a color card from the card stock field when a rainbow card, the player 1's color card and the player 2's color card are placed as shown in FIG. 24, squares on which the player 1 is allowed to place the color card are as shown in FIG. 25. To be specific, the placement permission flag 2523 is set to ON for vacant squares each of which is adjacent to the player 1's color card or the rainbow card, and the vacant squares are set to be squares on which the player 1 is allowed to place the color card. On the other hand, when the player 1 selects a rainbow card, all the vacant squares, except for vacant squares each of which is only adjacent to the player 2's color card, are set to be squares on which the player 1 is allowed to place the rainbow card as shown in FIG. 26. In other words, the number of squares on which the player 1 is allowed to place the rainbow card is greater than the number of squares on which the player 1 is allowed to place the color card. At this point, the image data 2522 of squares on which the player 1 is not allowed to place the color card or rainbow card is changed such that the squares are displayed as shaded squares so as to allow the player 1 to easily recognize the squares on which the player 1 is allowed to place the card.

Next, it is determined whether or not an operation, for selecting a square on which the selected tefuda card is to be placed, has been performed (step S30). To be specific, it is determined whether or not the player has performed a touch operation on any of the squares on which the player is allowed to place the selected tefuda card. When a result of the determination indicates that any of the squares, on which the player is allowed to place the tefuda card, has been selected (YES at step S30), a process for provisionally placing the selected tefuda card on the selected square is performed (step S31). To be specific, the card ID 2512 of the selected tefuda card is written, into the field data 252, as the card ID 2524 of the selected square. At the same time, the image data 2505 corresponding to the selected tefuda card is copied and stored as the image data 2522 of the selected square. Then, the processing proceeds to step S33. On the other hand, when it is determined that none of the squares, on which the player is allowed to place the tefuda card, has been selected (NO at step S30), it is further determined whether or not there already exists a provisionally placed card (step S32). When it is determined that there is no provisionally placed card (NO at step S32), the image display process is performed at step S29, and the processing returns to step S21 to repeat the above-described processes. On the other hand, when it is determined that there is a provisionally placed card (YES at step S32), the processing proceeds to step S33.

Next, it is determined whether or not the determine button 102 has been pressed (step S33). When a result of the determination indicates that the determine button 102 has not been pressed (NO at step S33), it is further determined whether or not a touch operation has been performed on the card provisionally placed at step S31 (step S38). When a result of the determination indicates that the touch operation has not been performed on the provisionally placed card (NO at step S38), the image display process is performed at step S29, and the processing returns to step S21 to repeat the above-described processes.

On the other hand, when it is determined that the provisionally placed card has been touched (YES at step S38), this indicates that the operation to rotate the provisionally placed card has been performed. Accordingly, a process to rotate the provisionally placed card is performed (step S39). To be specific, such a process as to rotate the provisionally placed card by 90 degrees to the right is performed (see, e.g., FIG. 15). As a result, a position of the connecting portion 110 of the provisionally placed card is changed, and the connecting portion data 2504 is updated, accordingly (step S40). To be specific, the card data 250 is accessed based on the card ID 2524 of the selected square, and the connecting portion data 2504 of a card corresponding to the card ID 2524 is updated so as to indicate the position of the connecting portion after rotation. For example, when the position of the connecting portion moves from the upper side to the right side due to the 90-degree rotation of the tefuda card, the connecting portion data 2504 is, assuming that the connecting portion data 2504 is represented by 4 bits as described above, updated from '1000' to '0100'. Here, the display may be provided such that the number shown on the provisionally placed tefuda card does not rotate, because the number becomes less recognizable for the player if the number rotates (in other words, the display may be provided such that only the connecting portion 110 in the display shifts by 90 degrees).

On the other hand, when the determination result at step S33 indicates that the determine button 102 has been pressed (YES at step S33), a process for fixedly placing the tefuda card is performed (step S34). To be specific, image data which indicates that the tefuda card has been fixedly placed (e.g., image data which indicates a change in color of a frame of the fixedly placed tefuda card) is set as the image data 2522 of the square on which the tefuda card has been fixedly placed. Further, the card ID 2512 of the fixedly placed tefuda card is deleted from the card stock data 251.

Next, the card placement information about the fixedly placed tefuda card is transmitted to the handheld game apparatus 10 of the opponent player (step S35). This card placement information contains a position of the square, on which the tefuda card is fixedly placed, and data of the fixedly placed tefuda card which is contained in the card data 250. This enables the player to communicate details of an operation performed by the player to the opponent player, and allows the details of the operation performed by the player to be shown on the handheld game apparatus of the opponent player. Note that, each time the player performs an operation, the handheld game apparatus of the player may transmit the card placement information to the other handheld game apparatus, and the operation performed by the player (e.g., rotation operation) maybe shown in real time on each handheld game apparatus.

Next, all the flags are set to OFF (step S36). Then, the image display process is performed in order to display a game image on the screen (step S37), and the card placement process ends.

Return to FIG. 21. When the card placement process ends, a combined state determination process is performed (step S8). Performed here is a process for determining, for color cards of a player currently taking his/her turn, a combined state of placement cards on the field 101, in which process a placement card most recently and fixedly placed in the above-described manner is used as a reference point for the determination. When the player is not taking his/her turn, the player is receiving, at step S13, the card placement information about the opponent player. Accordingly, determined at the time is a combined state of placement cards placed by the opponent player. Thus, when the player is taking his/her turn, determined at the time is a combined state of placement cards (color cards) of the player, whereas when the opponent player is taking his/her turn, determined at the time is a combined state of placement cards (color cards) of the opponent player.

Figure 27:
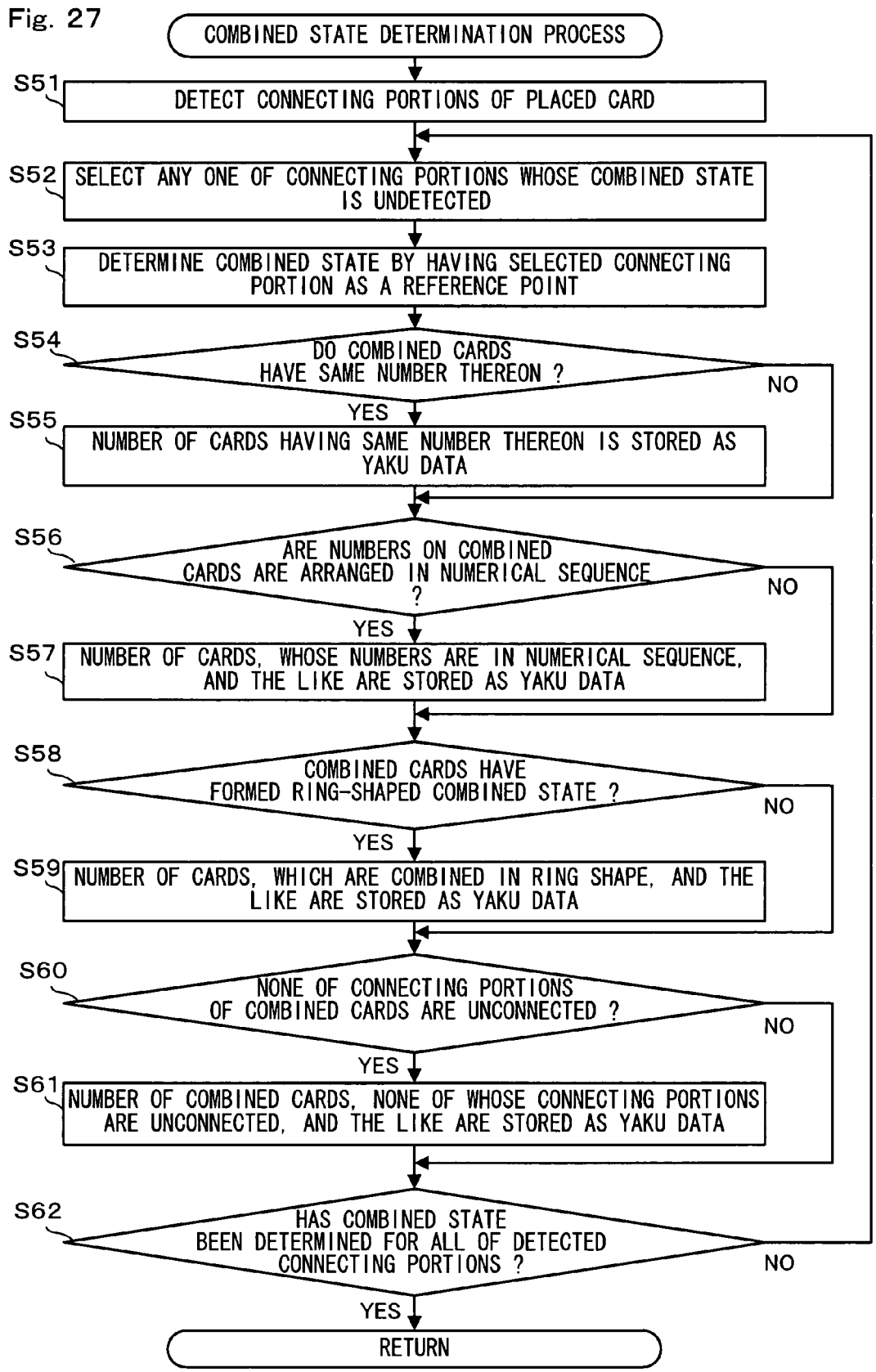
FIG. 27 is a flowchart showing in detail a combined state determination process at step S8 of FIG. 21.

FIG. 27 is a flowchart showing in detail the combined state determination process at step S8. As shown in FIG. 27, connecting portions 110 of the most recently and fixedly placed tefuda card are detected (step S51). To be specific, the card ID 2524 of the most recently placed placement card is obtained from the field data 252. Next, based on the card ID 2524, the card data 250 is accessed, whereby the connecting portion data 2504 of a card corresponding to the card ID 2524 is obtained. Based on the connecting portion data 2504, the number of connecting portions 110 and positions thereof are detected.

Next, a connecting portion 110 from which a combined state is detected, i.e., a connecting portion 110 which is to be a reference point for determining the combined state of placement cards, is selected (step S52). Selected here is one of the aforementioned detected connecting portions 110, which has not been subjected to a later-described process. It is assumed in the present embodiment that a priority order for selecting one of the connecting portions 110 is as follows: the upper-side connecting portion, right-side connecting portion, lower-side connecting portion, and the left-side connecting portion.

Figure 28:
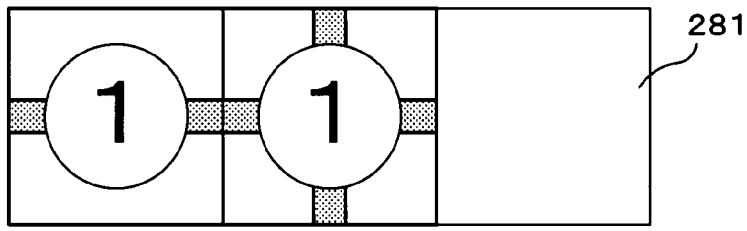
FIG. 28 is a diagram for describing a process for determining a combined state.
Figure 29:
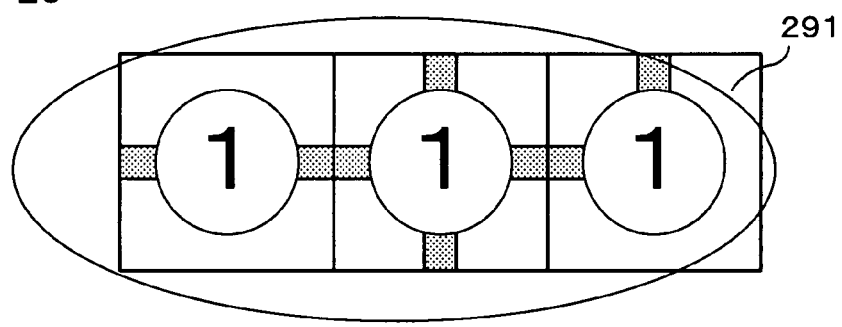
FIG. 29 is a diagram for describing the process for determining a combined state.

Next, the selected connecting portion 110 is set as the reference point, and adjacent placement cards are sequentially examined from this reference point, whereby the combined state of the placement cards is determined. To be more specific, it is first determined whether there exists a placement card adjacent to the reference point. When there exists such an adjacent placement card, the connecting portion data 2504 of the placement card is obtained, and a determination as to whether a combined state is formed is provided. This determination is sequentially provided for each adjacent placement card from the reference point. Then, data indicating a combined state detected as a result of the determination is stored as the combined state data 253 (step S53). This process is described below with reference to FIGS. 28 to 35. Here, FIG. 28 shows an example in which two placement cards each having a number '1' thereon are laterally combined with each other (it is assumed here that there is no other placement card). In addition to this, a placement card 291, which has a number '1' thereon and which is provided with connecting portions on the upper and left sides thereof, is fixedly placed. A square on which the placement card 291 is placed is a vacant square 281 at the rightmost position in FIG. 28. As a result, as shown in FIG. 29, there are three laterally combined placement cards each having a number '1' thereon. In this case, it is detected with respect to the fixedly placed card 291 (i.e., the card at the rightmost position) that three placement cards are combined (hereinafter, this state is referred to as a three-card combination) in a leftward direction from the card 291. On the other hand, since there is no placement card placed on the upper side of the fixedly placed card 291, it is determined that there is no combination formed in the upper direction.

Figure 30:
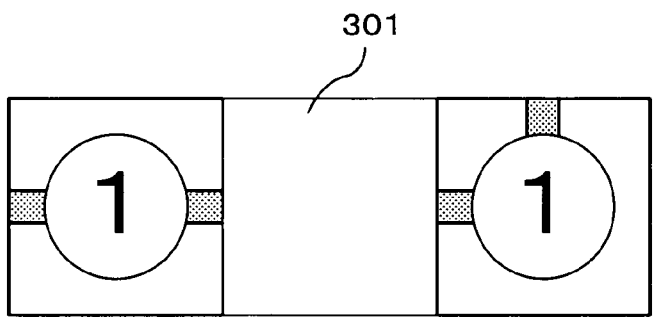
FIG. 30 is a diagram for describing the process for determining a combined state.
Figure 31:
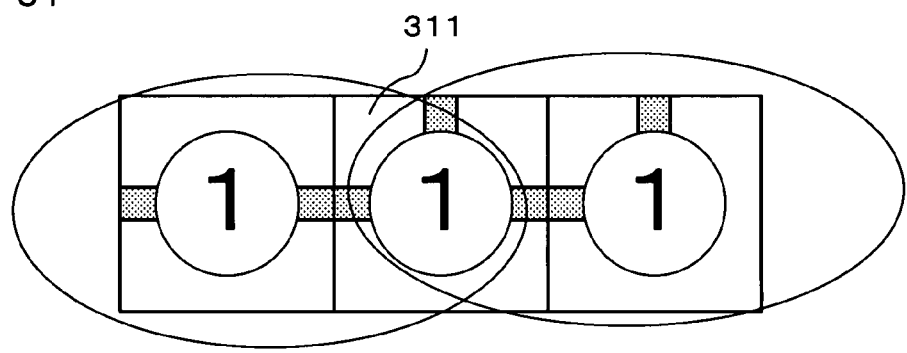
FIG. 31 is a diagram for describing the process for determining a combined state.

Below is another example in which, as shown in FIG. 30, two placement cards each having a number '1' thereon are laterally placed, and there is a vacant square 301 therebetween. In addition to this, a tefuda card, which is provided with connecting portions 110 at the upper, left and right sides thereof, is fixedly placed on the vacant square 301. As a result, the placement cards each having a number '1' thereon laterally form a three-card combination as shown in FIG. 31. In this case, a combined state in a leftward direction from the fixedly placed tefuda card, i.e., a placement card 311, and a combined state in a rightward direction from the placement card 311 are separately determined. In the case of FIG. 31, one placement card is combined with the placement card 311 at the left side of the placement card 311, and the other placement card is combined with the placement card 311 at the right side of the placement card 311. Accordingly, it is detected that two placement cards are combined in the leftward direction (hereinafter, this state is referred to as 'two-card combination'), and that two placement cards are combined also in the rightward direction. In other words, in the case of FIG. 31, it is determined as a result that there exist two two-card combinations (a two-card combination formed via the left-side connecting portion of the placement card 311 and a two-card combination formed via the right-side connecting portion of the placement card 311).

Figure 32:
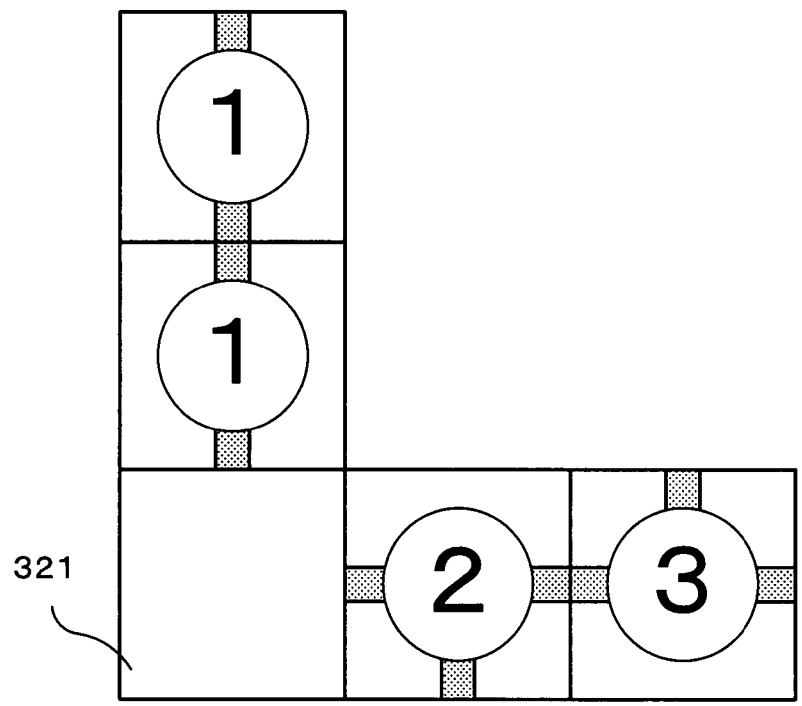
FIG. 32 is a diagram for describing the process for determining a combined state.
Figure 33:
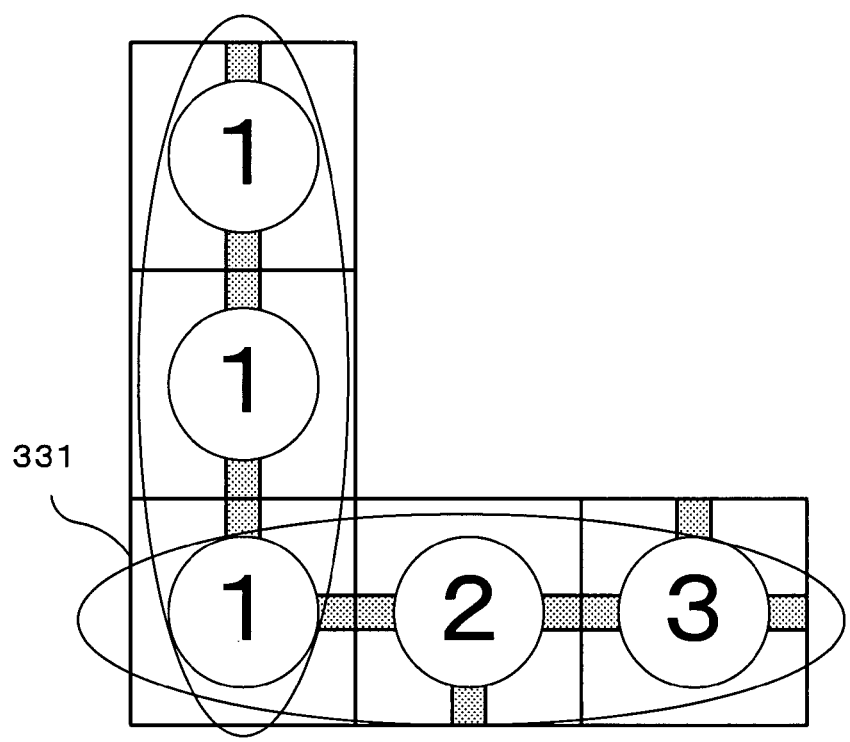
FIG. 33 is a diagram for describing the process for determining a combined state.

Provided below is another further example in which, as shown in FIG. 32, two placement cards form a two-card combination in a longitudinal direction, and other two placement cards form a two-card combination in a lateral direction. In addition to this, a tefuda card, which is provided with connecting portions at the upper and right sides thereof, is placed on a vacant square 321, via which the placement cards of the two-card combinations form an L-shape and which is an intersection of the L-shape. Consequently, such a state as shown in FIG. 33 is obtained in which a three-card combination is formed in an upper direction from the fixedly placed tefuda card, i.e., tefuda card 331, and a three-card combination is formed also in a rightward direction from the tefuda card 331. In this case, it is determined as a result that there exist two three-card combinations (a three-card combination formed via the upper-side connecting portion of the tefuda card 331 and a three-card combination formed via the right-side connecting portion of the tefuda card 331).

Figure 34:
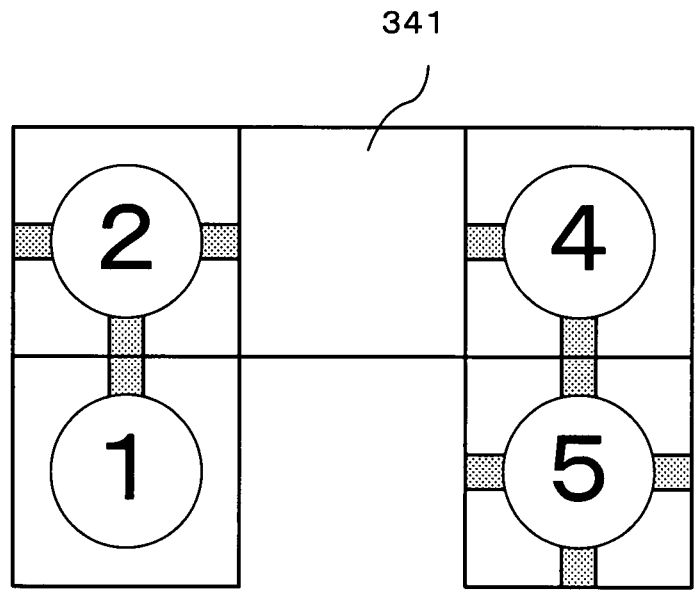
FIG. 34 is a diagram for describing the process for determining a combined state.
Figure 35:
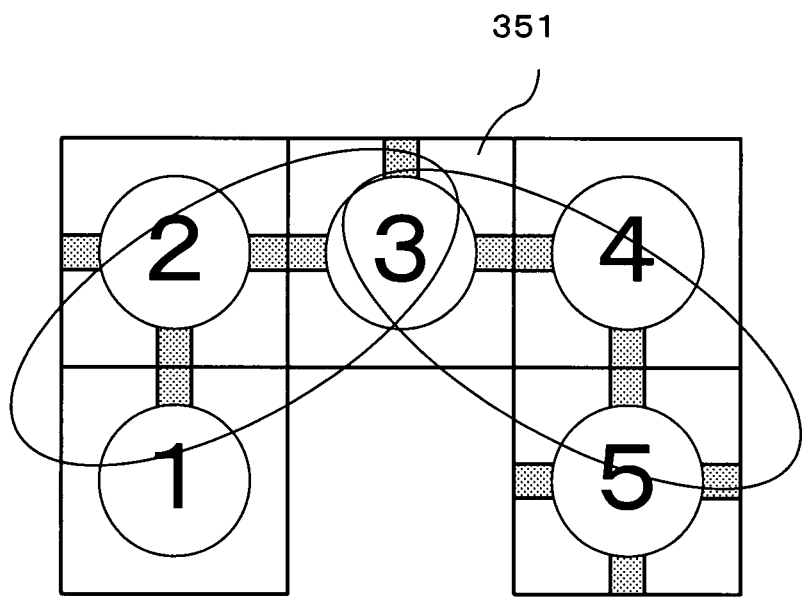
FIG. 35 is a diagram for describing the process for determining a combined state.

Provided below is another further example in which, as shown in FIG. 34, two two-card combinations, each of which is formed in a longitudinal direction by placement cards, are formed in parallel to each other, while having a vacant square 341 therebetween. In addition to the state shown in FIG. 34, a tefuda card 351, which is provided with connecting portions at the upper, right and left sides thereof, is fixedly placed on the vacant square 341. In this case, such a state as shown in FIG. 35 is obtained. Then, it is determined that there are two combined states, one of which is a combined state in which a placement card is combined with the fixedly placed tefuda card 351 at the left side of the tefuda card 351 and another placement card is combined with the placement card at the lower side of the placement card (three-card combination), and the other of which is a combined state in which a placement card is combined with the tefuda card 351 at the right side of the tefuda card 351 and another placement card is combined with the placement card at the lower side of the placement card (three-card combination).

Note that, in the present embodiment, the determination about the combined state is performed for only color cards and rainbow cards of the player. In other words, a color card of the player does not combine with a color card of the opponent player. Therefore, even if a color card of the player and a color card of the opponent player are placed so as to be adjacent to each other and connecting portions 110 thereof appear to be connected, such a state is not determined to be a combined state.

Return to FIG. 27. After the determination about the combined state is provided, it is determined whether or not the combined placement cards have a same number. In other words, it is determined whether or not the 'same number combination' has been formed (step S54). This determination is performed in, e.g., the following manner: the card data 250 is accessed; the card data 250 is searched based on the card IDs 2501 of the combined placement cards; the number data 2503 of the placement cards is obtained; and it is determined whether or not numbers obtained from the number data are the same. When a result of the determination indicates that the obtained numbers are the same (YES at step S54), the completion flag 2545 of the same number combination information 2541 is set to ON. At the same time, the yaku number 2546 and combined card number 2547 of the same number combination information 2541 are stored (step S55). In the example of FIG. 29, the yaku number 2546 and the combined card number 2547 of the 'same number combination' are stored as '1' and '3', respectively. Also, in the example of FIG. 31, the number of yakus '2' is stored, and the number of combined cards '2' are stored for each yaku as a result. Further, in the example of FIG. 33, the number of yakus '1' and the number of combined cards '3' are stored. On the other hand, when the result of the determination indicates that the obtained numbers are not the same, i.e., when the 'same number combination' has not been formed (NO at step S54), the process at step S55 is not performed, and the processing proceeds to a next step.

Return to FIG. 27. It is determined next whether or not the numbers on the combined placement cards are sequential numbers (ascending or descending) starting from the number on the most-recently and fixedly placed placement card, i.e., whether or not the 'sequential number combination' has been formed (step S56). When a result of the determination indicates that the numbers on the combined placement cards are sequential numbers (YES at step S56), the completion flag 2545 of the sequential number combination information 2542 is set to ON. At the same time, the yaku number 2546 and combined card number 2547 of the sequential number combination information 2542 are stored (step S57). In the example of FIG. 33, the number of yakus '1' and the number of combined cards '3' are stored (FIG. 33 shows a state in which the same number combination and sequential number combination are formed at the same time). Further, in the case of FIG. 35, the number of yakus '2' is stored, and the number of combined cards '3' is stored for each yaku. On the other hand, when the numbers on the combined placement cards are not sequential numbers, i.e., when the 'sequential number combination' has not been formed (NO at step S56), the process at step S57 is not performed, and the processing proceeds to a next step.

Return to FIG. 27. It is determined next whether or not the combined state of the combined placement cards is a ring-shaped combined state (see FIGS. 10 and 14). In other words, it is determined whether the 'encompassing combination' has been formed (step S58). When a result of the determination indicates that the placement cards are combined in a ring-shaped manner (YES at step S58), the completion flag 2545 of the encompassing combination information 2543 is set to ON. At the same time, the yaku number 2546 and combined card number 2547 of the encompassing combination information are stored (step S59). On the other hand, when the placement cards are not combined in a ring-shaped manner, i.e., when the 'encompassing combination' has not been formed (NO at step S58), the process at step S59 is not performed, and the processing proceeds to a next step. For example, when the most recently placed card is a card (having connecting portions at the right and lower sides thereof) positioned at the upper left corner in the example of 'encompassing combination' of FIG. 10, there are two 'encompassing combinations' originating from the most recently placed card, one of which proceeds in a rightward direction from the most recently placed card and the other of which proceeds in a downward direction from the most recently placed card. However, it is not determined here that there are two 'encompassing combinations'. It is determined here that there is only one 'encompassing combination'. For example, it is first determined that there is the encompassing combination proceeding in the rightward direction. Thereafter, when the encompassing combination proceeding in the downward direction is detected, it is determined whether or not shapes of the combined states of these encompassing combinations are the same, and if the shapes are the same, the yaku number 2546 and combined card number 2547 of the second detected encompassing combination are not additionally stored. In other words, when it is determined that the combined state of the placement cards is an encompassing combination, a combined state having the same shape as that of the combined state is ignored.

Figure 36:
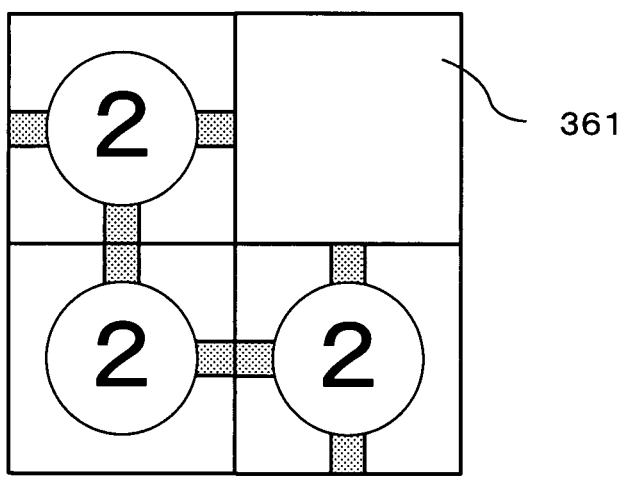
FIG. 36 is a diagram for describing the process for determining a combined state.
Figure 37:
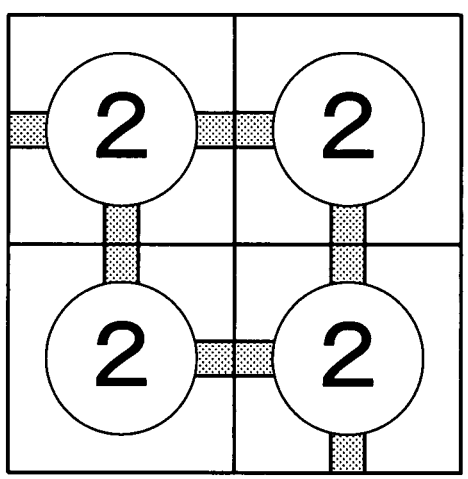
FIG. 37 is a diagram for describing the process for determining a combined state.

When the same number combination is formed in an L-shape as shown in FIG. 36, and a tefuda card, which has a same number as that of cards shown in FIG. 36 and which is provided with connecting portions at the left and lower sides thereof, is placed on a vacant square 361 positioned at the upper right corner of FIG. 36, a state as shown in FIG. 37 is obtained in which the encompassing combination is formed and also the same number combination is formed by four combined placement cards. Here, there are two same number combinations, one of which originates from a connecting portion at the left side of the above placed card, and the other of which originates from a connecting portion at the lower side of the above placed card. When such a plurality of same number combinations having a same shape are formed, it is determined that there are two same number combinations which have different shapes from each other. In this case, however, it may be determined, in the same manner as that of the encompassing combination, that there is only one same number combination (this also applies to the case of sequential number combination).

Return to FIG. 27. Next, it is determined whether or not the combined state of the placement cards shows that the placement cards are combined in such a manner that none of the connecting portions thereof are unconnected (see FIG. 11), i.e., whether or not the 'perfect combination' has been formed (step S60). When a result of the determination indicates that the 'perfect combination' has been formed (YES at step S60), the completion flag 2545 of the perfect combination information 2544 is set to ON. At the same time, the yaku number 2546 and combined card number 2547 of the perfect combination information 2544 are stored (step S61). On the other hand, when the 'perfect combination' has not been formed (NO at step S60), the process at step S61 is not performed, and then the processing proceeds to a next step.

Next, it is determined whether or not the above-described determination about the combined state has been performed for all the connecting portions detected at step S51 (step S62). When a result of the determination indicates that there is still a connecting portion for which the determination about the combined state has not been performed (NO at step S62), the processing returns to step S52, and the processes are performed again. On the other hand, when the result of the determination indicates that the determination about the combined state has been performed for all the connecting portions (YES at step S62), the combined state determination process ends.

Return to FIG. 21. When the combined state determination process ends, points are calculated based on the yaku data 254 (step S9). To be specific, in the case of 'same number combination', 'sequential number combination' and 'encompassing combination', the number of combined cards×10 points are added for each formed yaku, and the number of combined cards×20 points are added in the case of 'perfect combination'. Then, the calculated points are stored as the point data 255 which corresponds to the player currently taking his/her turn. When the point calculation is completed, contents of the yaku data 254 are deleted.

Next, it is determined whether or not any player has acquired predetermined points or more, i.e., win/loss determination is performed (step S10). To be specific, the point data 255 in the work region 249 is accessed, and it is determined whether or not points of any player have reached the predetermined points. When a result of the determination indicates that any player has acquired the predetermined points or more, a process for indicating a win/loss result (e.g., generating a win/loss result display) is performed.

After step S10, a display process is performed at step S11. To be specific, a process, for displaying, as a game image on the second LCD12, an image of a virtual space which has been taken by a virtual camera. After step S11, it is determined at step S12 whether or not the game has ended (e.g., whether or not a win/loss result has been determined). When a result of the determination indicates YES, the player-versus-player board game process ends. On the other hand, when the result of the determination indicates NO, '1' is added to a turn number (steps S13 and S14), and the processing returns to step S2 to reiterate the processes for the game. Thereafter, the player-versus-player board game process of the present embodiment ends.

As described above, in the present embodiment, the player arbitrarily selects a card, and places the card on the field. Then, the combined state of the placed card is determined, and the processes for the game, such as adding points, are performed based on the combined state. In other words, the processes performed based on the combined state of the card, which the player has arbitrarily selected and placed, are used for the player-versus-player game. This makes it possible to provide the novel and highly strategic player-versus-player game, in which each player is required to play in such a manner as to arrange the combined state of cards to form a yaku while attempting to hinder an opponent player from forming a yaku.

Although in the above embodiment the determination about yaku is performed based on the 'number' set for each card, the present invention is not limited thereto. Alphabet letters, symbols or the like maybe used instead of the number. For example, it may be determined that a yaku has been formed when cards each having a same letter thereon such as 'AAA' are combined, or when cards, which are arranged such that letters thereon read 'ABC', are combined.

Although the above embodiment describes an example in which the cards are square shaped, cards in polygonal shape other than square may be used. Then, each side of such a polygonal shaped card may be provided with a parameter for determining the combined state of the card, the parameter corresponding to the above-described connecting portion.

Further, in the above embodiment, the combined state of cards is determined based on the most recently placed placement card. However, the present embodiment is not limited thereto. The determination may not be based on the most recently placed placement card. For example, in the case of FIG. 31, it may be determined that there is a single same number combination formed by three cards. Also, in the case of FIG. 35, it may be determined that there is a single sequential number combination formed by five cards.

Still further, in the above embodiment, cards having formed a yaku (cards by which a predetermined combined state has been formed) remain on the field 101. However, the present embodiment is not limited thereto. The cards having formed a yaku may be deleted from the field 101. This allows new cards to be placed on vacant squares from which the cards have been previously deleted. This enables the game field to be efficiently used.

Still further, the above embodiment describes an example in which the handheld game apparatus having two display devices is used. However, a handheld device, which has a single display device whose screen has a touch panel provided thereon, may be used instead. Still further, in the above embodiment, the touch panel is described as an example of a device for detecting a position within an operation region, which position has been designated by the player. However, used here as the device for detecting such a position may be any so-called pointing device which is capable of allowing the player to designate a position within a predetermined area, e.g., a mouse capable of designating an arbitrary position on the screen, a tablet for designating an arbitrary position on an operation surface which does not have a display screen, or a pointing device capable of calculating coordinates on a display screen based on a position of, e.g., the display screen or a marker, which position is present within an image which is taken by a device when the device, which has image pickup means for taking from a remote position an image of the display screen or the marker provided in the vicinity of the display screen, points in the direction of the display device, and which coordinates correspond to a position, on the display screen, pointed by the device.

Still further, the game apparatus is not limited to the above embodiment. The present embodiment is similarly applicable to a game apparatus whose monitor is separately provided, a game apparatus having a monitor integrated therein, a personal computer capable of functioning as a game apparatus by executing a game program, a workstation, and the like.

While the embodiment presented herein has been described in detail, the foregoing description is in all aspects illustrative and not restrictive. It is understood that numerous other modifications and variations can be devised without departing from the scope of the embodiment.

What is claimed is:

1. A non-transitory storage medium storing a game program for causing a computer of a game apparatus to execute a player-versus-player board game in which a plurality of players alternately place predetermined panels on a predetermined game field, thereby playing against each other, the game program causing the computer to perform:

game field displaying for displaying, on a screen, a game field comprising a plurality of squares;
panel displaying for displaying, on the screen, the panels which are respectively associated with the plurality of players and each of which is provided with one or more connecting portions at respective sides of the panel for forming a combined state with another panel by matching connecting portions with the another panel, wherein each panel has a distinct pattern of connecting portions associated therewith, said matching of connecting portions is based on linear alignment of connecting portions of adjacent sides of respective panels;
panel selecting for, based on an operation performed by each player, selecting a corresponding one of the panels;
square selecting for, based on an operation performed by said each player, selecting from the game field a square on which the corresponding one of the panels is to be placed;
panel placing for placing, on the square selected by the square selecting, the corresponding one of the panels which has been selected by the panel selection;
combined state determining for determining whether or not panels, associated with a same player, among a plurality of panels placed on the game field have formed a predetermined combined state via the connecting portions; and
evaluating the predetermined combined state which the combined state determining has determined to have been formed, wherein
the game program further causes the computer to perform combined panel number detecting for, when the combined state determining determines that the panels among the plurality of panels placed on the game field have formed the predetermined combined state via the connecting portions and that the panels forming the predetermined combined state are associated with the same player, detecting a number of panels forming the predetermined combined state, and
the evaluating evaluates the combined state in accordance with the number of panels detected by the combined panel number detecting.

2. The non-transitory storage medium storing the game program according to claim 1, wherein
the combined state determining determines, based on a placement location of a most recently placed panel among panels placed by the panel placing, whether or not the predetermined combined state has been formed.

3. The non-transitory storage medium storing the game program according to claim 1, wherein
the game program further causes the computer to perform adjacent state determining for determining whether or not there is already a panel placed on a square adjacent to the selected square, which panel is associated with a player, based on whose operation the selected square has been selected, and
the panel placing places the selected corresponding one of the panels only when the adjacent state determining determines that there is already a panel placed on the square adjacent to the selected square, which panel is associated with the player, based on whose operation the selected square has been selected.

4. The non-transitory storage medium storing the game program according to claim 1, wherein
the panel displaying further displays on the screen a common panel which is not associated with any of the players,
the panel selecting selects, based on an operation performed by each player, a corresponding one of the panels or the common panel,
the panel placing places the corresponding one of the panels or the common panel, which is selected by the panel selection, on the square selected by the square selecting, and
the combined state determining determines whether or not panels among the plurality of panels placed on the game field have formed a predetermined combined state via the connecting portions, and whether the panels forming the predetermined combined state are associated with a same player or include the common panel.

5. The non-transitory storage medium storing the game program according to claim 3, wherein
the panel displaying further displays, on the screen, a common panel which is not associated with any of the players,
the panel selecting selects, based on an operation performed by each player, a corresponding one of the panels or the common panel,
the panel placing places the corresponding one of the panels or the common panel, which is selected by the panel selecting, on the square selected by the square selection,
the adjacent state determining determines whether or not there is already a panel or the common panel placed on a square adjacent to the selected square, which panel is associated with a player, based on whose operation the selected square has been selected, and
the panel placing places the corresponding one of the panels or the common panel, which has been selected, only when the adjacent state determining determines that there is already a panel or the common panel placed on the square adjacent to the selected square, which panel is associated with the player, based on whose operation the selected square has been selected.

6. The non-transitory storage medium storing the game program according to claim 1, wherein
the game program further causes the computer to perform connecting portion position changing to change, on the panels, positions in which the connecting portions are provided.

7. The non-transitory storage medium storing the game program according to claim 1, wherein
the panel displaying displays the panels which are respectively provided with, in addition to the connecting portions, pieces of identification information each indicating a content of a corresponding one of the panels, and
the evaluating includes:
identification information determining for determining whether or not the pieces of identification information about the panels forming the predetermined combined state satisfy a predetermined condition; and
identification information evaluating for evaluating the predetermined combined state in accordance with a determination result provided by the identification information determining.

8. The non-transitory storage medium storing the game program according to claim 7, wherein the identification information determining determines that the predetermined condition is satisfied when the pieces of identification information about the panels forming the predetermined combined state indicate a same content, or when the pieces of identification information about the panels forming the predetermined combined state respectively indicate different contents and are arranged in a predetermined order.

9. A game apparatus for executing a player-versus-player board game in which a plurality of players alternately place predetermined panels on a predetermined game field, thereby playing against each other, the game apparatus comprising:
a game field display for displaying, on a screen, a game field comprising a plurality of squares;
a panel display for displaying, on the screen, the panels which are respectively associated with the plurality of players and each of which is provided with one or more connecting portions at respective sides of the panel for forming a combined state with another panel by matching connecting portions with the another panel, wherein each panel has a distinct pattern of connecting portions associated therewith, said matching of connecting portions is based on linear alignment of connecting portions of adjacent sides of respective panels; and
a computer processor configured to perform:
panel selection for, based on an operation performed by each player, selecting a corresponding one of the panels;
square selection for, based on an operation performed by said each player, selecting from the game field a square on which the corresponding one of the panels is to be placed;
panel placing for placing, on the square selected by the square selection, the corresponding one of the panels which has been selected by the panel selection;
combined state determination for determining whether or not panels, associated with a same player, among a plurality of panels placed on the game field have formed a predetermined combined state via the connecting portions; and
evaluation for evaluating the predetermined combined state which the combined state determination has determined to have been formed, wherein
the computer processor further performs combined panel number detecting for, when the combined state determination determines that the panels among the plurality of panels placed on the game field have formed the predetermined combined state via the connecting portions and that the panels forming the predetermined combined state are associated with the same player, detecting a number of panels forming the predetermined combined state, and
the evaluation evaluates the combined state in accordance with the number of panels detected by the combined panel number detecting.

10. A method for executing a player-versus-player board game in which a plurality of players alternately place predetermined panels on a predetermined game field, thereby playing against each other, the method comprising:
generating a display of, for a screen, a game field comprising a plurality of squares;
generating a display of, for the screen, the panels which are respectively associated with the plurality of players and each of which is provided with one or more connecting portions at respective sides of the panel for forming a combined state with another panel by matching connecting portions with the another panel, wherein each panel has a distinct pattern of connecting portions associated therewith, said matching of connecting portions is based on linear alignment of connecting portions of adjacent sides of respective panels;

selecting, based on an operation performed by each player, a corresponding one of the panels;

selecting, based on an operation performed by said each player, selecting from the game field a square on which the corresponding one of the panels is to be placed;

placing, on the square selected by the selected square, the corresponding one of the panels which has been selected;

determining, using a microprocessor, whether or not panels, associated with a same player, among a plurality of panels placed on the game field have formed a predetermined combined state via the connecting portions; and evaluating, using a microprocessor, the predetermined combined state which the combined state determining has determined to have been formed, wherein a microprocessor further performs combined panel number detecting for, when the combined state determining determines that the panels among the plurality of panels placed on the game field have formed the predetermined combined state via the connecting portions and that the panels forming the predetermined combined state are associated with the same player, detecting a number of panels forming the predetermined combined state, and the evaluating evaluates the combined state in accordance with the number of panels detected by the combined panel number detecting.

11. A game apparatus comprising a computer processor configured to:

perform game field displaying for displaying, on a screen, a game field comprising a plurality of squares;

perform panel displaying for displaying, on the screen, the panels which are respectively associated with a plurality of players and each of which is provided with one or more connecting portions at respective sides of the panel for forming a combined state with another panel by matching connecting portions with the another panel, wherein each panel has a distinct pattern of connecting portions associated therewith, said matching of connecting portions is based on linear alignment of connecting portions of adjacent sides of respective panels;

perform panel selecting for, based on an operation performed by each player, selecting a corresponding one of the panels;

perform square selecting for, based on an operation performed by said each player, selecting from the game field a square on which the corresponding one of the panels is to be placed;

perform panel placing for placing, on the square selected by the square selection, the corresponding one of the panels which has been selected by the panel selection;

perform combined state determining for determining whether or not panels, associated with a same player, among a plurality of panels placed on the game field have formed a predetermined combined state via the connecting portions; and perform evaluating for evaluating the predetermined combined state which the combined state determining has determined to have been formed, wherein the computer processor further performs combined panel number detecting for, when the combined state determining determines that the panels among the plurality of panels placed on the game field have formed the predetermined combined state via the connecting portions and that the panels forming the predetermined combined state are associated with the same player, detecting a number of panels forming the predetermined combined state, and the evaluating evaluates the combined state in accordance with the number of panels detected by the combined panel number detecting.

* * * * *